US012663955B2

(12) United States Patent
Lawrence

(10) Patent No.: US 12,663,955 B2
(45) Date of Patent: Jun. 23, 2026

(54) METHODS, SYSTEMS, ARTICLES OF MANUFACTURE, AND APPARATUS TO DYNAMICALLY DETERMINE INTERACTION DISPLAY REGIONS FOR SCREEN SHARING

(71) Applicant: Intel Corporation, Santa Clara, CA (US)

(72) Inventor: Sean J. W. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/856,571

(22) Filed: Jul. 1, 2022

(65) Prior Publication Data

US 2022/0334790 A1 Oct. 20, 2022

(51) Int. Cl.
*G06F 3/14* (2006.01)
*H04N 7/15* (2006.01)
(52) U.S. Cl.
CPC ............. *G06F 3/1454* (2013.01); *H04N 7/15* (2013.01)

(58) Field of Classification Search
CPC ................................ G06F 3/1454; H04N 7/15
See application file for complete search history.

(56) References Cited

U.S. PATENT DOCUMENTS 10,474,416 B1 * 11/2019 Farivar ............... H04L 65/4015

* cited by examiner

*Primary Examiner* — Olisa Anwah
(74) *Attorney, Agent, or Firm* — Hanley, Flight & Zimmerman, LLC

(57) ABSTRACT

Methods, apparatus, systems, and articles of manufacture are disclosed to dynamically determine interaction display regions for screen sharing. Example apparatus disclosed herein are to generate a screen share frame corresponding to content rendered on the display and intended for the screen share event; identify application-related contextual data corresponding to the screen share event; determine an interactive context based on at least one of (a) the application-related contextual data and (b) sensor data from at least one sensor, the interactive context including identification of an interaction region of the screen share frame; generate interaction metadata that includes the interactive context; and transmit a transport stream that includes the interaction metadata and the screen share frame.

21 Claims, 17 Drawing Sheets

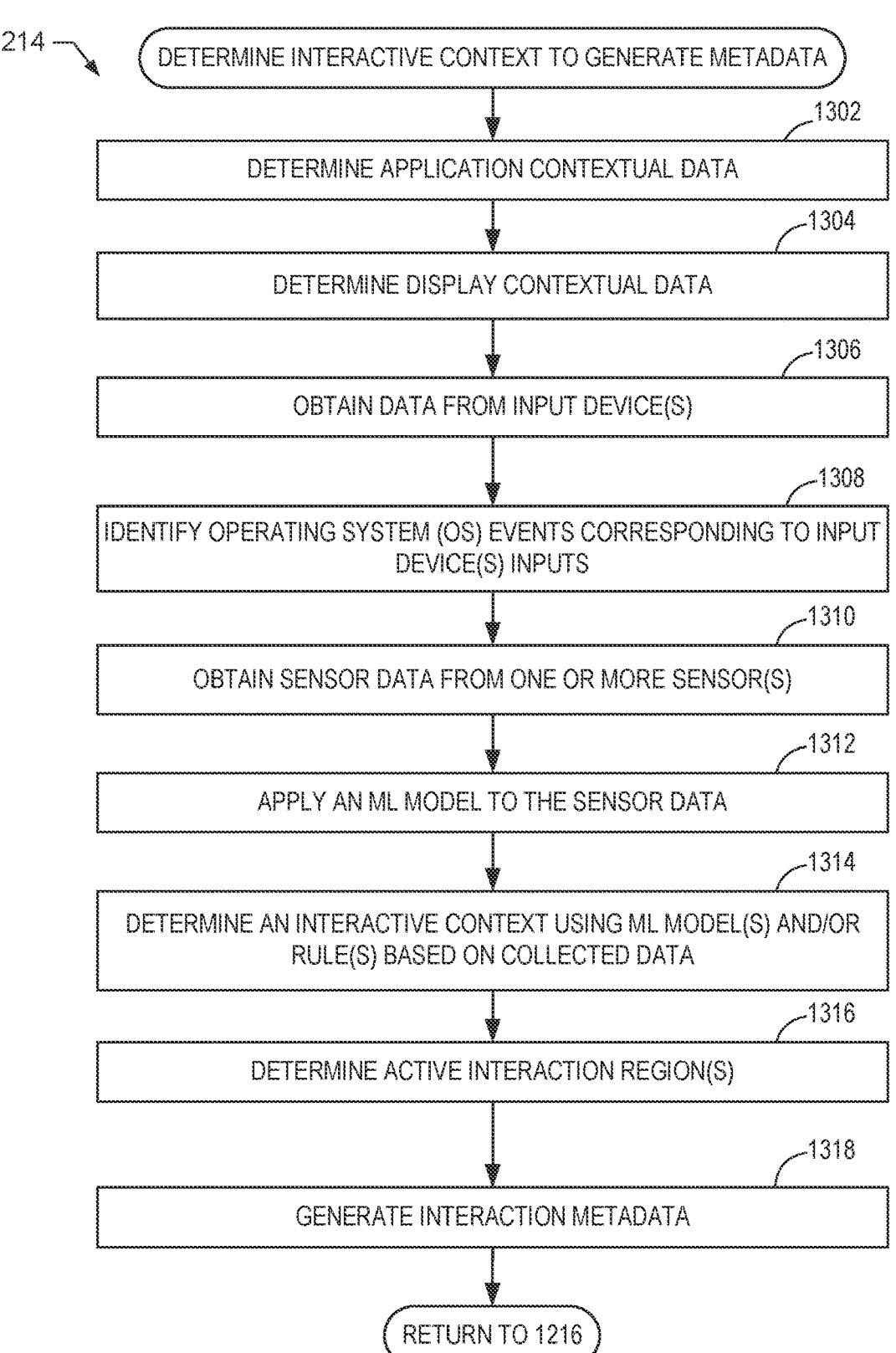

1214

DETERMINE INTERACTIVE CONTEXT TO GENERATE METADATA

1302
DETERMINE APPLICATION CONTEXTUAL DATA

1304
DETERMINE DISPLAY CONTEXTUAL DATA

1306
OBTAIN DATA FROM INPUT DEVICE(S)

1308
IDENTIFY OPERATING SYSTEM (OS) EVENTS CORRESPONDING TO INPUT DEVICE(S) INPUTS

1310
OBTAIN SENSOR DATA FROM ONE OR MORE SENSOR(S)

1312
APPLY AN ML MODEL TO THE SENSOR DATA

1314
DETERMINE AN INTERACTIVE CONTEXT USING ML MODEL(S) AND/OR RULE(S) BASED ON COLLECTED DATA

1316
DETERMINE ACTIVE INTERACTION REGION(S)

1318
GENERATE INTERACTION METADATA

RETURN TO 1216

FIG. 13

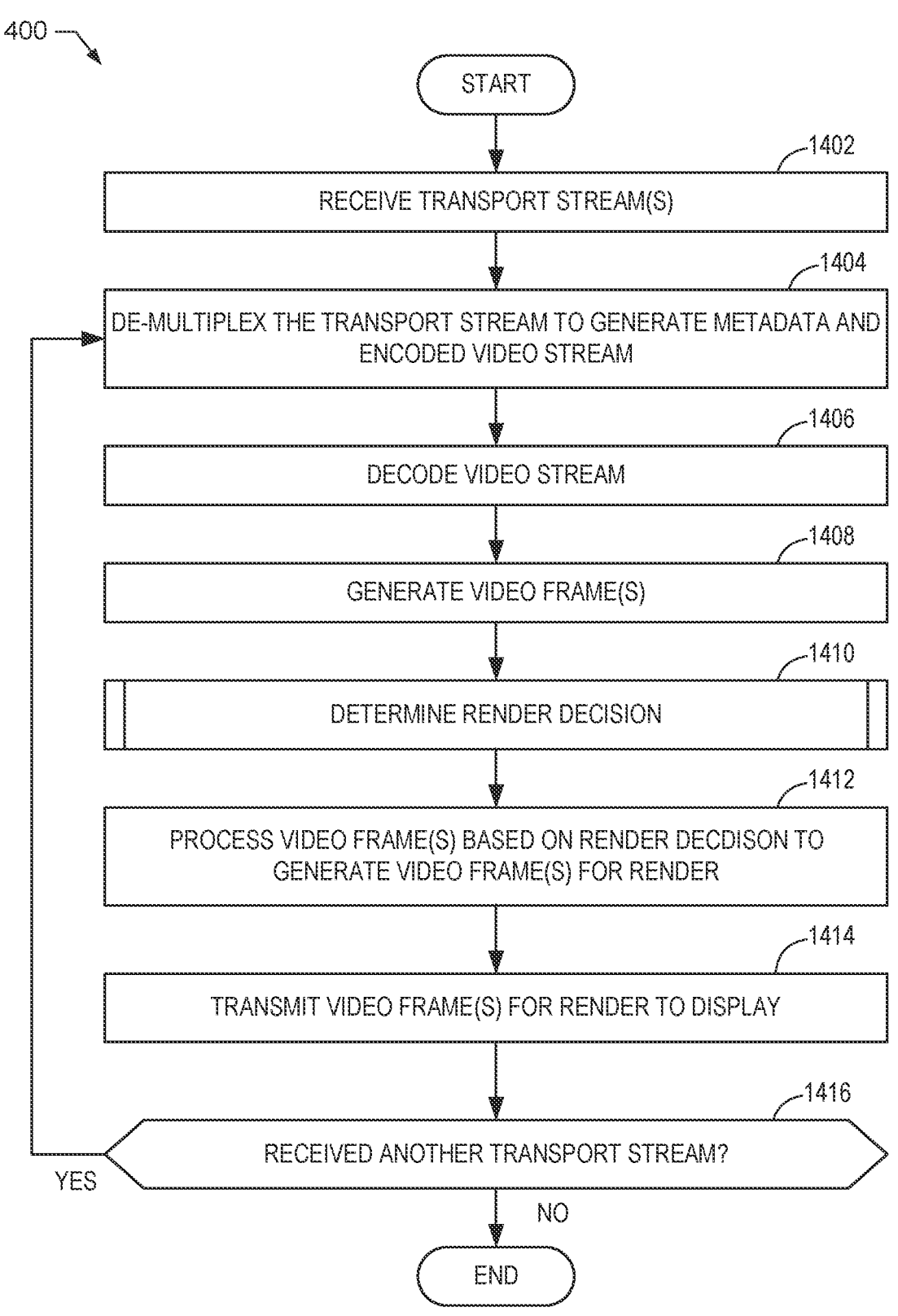

1400

START

1402

RECEIVE TRANSPORT STREAM(S)

1404

DE-MULTIPLEX THE TRANSPORT STREAM TO GENERATE METADATA AND ENCODED VIDEO STREAM

1406

DECODE VIDEO STREAM

1408

GENERATE VIDEO FRAME(S)

1410

DETERMINE RENDER DECISION

1412

PROCESS VIDEO FRAME(S) BASED ON RENDER DECDISON TO GENERATE VIDEO FRAME(S) FOR RENDER

1414

TRANSMIT VIDEO FRAME(S) FOR RENDER TO DISPLAY

1416

RECEIVED ANOTHER TRANSPORT STREAM?

YES

NO

END

DETERMINE RENDER INFORMATION

RECEIVE ACTIVE REGION METADATA AND SCREEN COORDINATES — 1502

OBTAIN DISPLAY INFORMATION — 1504

OBTAIN SENSOR(S) DATA — 1506

OBTAIN USER DATA AND/OR OTHER DATA — 1508

APPLY RENDER MACHINE LEARNING MODEL(S) AND/OR RULE(S) USING OBTAINED INPUT DATA — 1510

DETERMINE RENDER DECISION — 1512

RETURN TO 1414

1600

1614

VOLATILE
MEMORY

INSTR
1632

1617

MEMORY
CONTROLLER

1616

NON-VOLATILE
MEMORY

INSTR
1632

BUS
1618

1612

PROCESSOR
CIRCUITRY

LOCAL MEMORY
1613

INSTR
1632

102, 104

| 120 | 126 |
| 122 | 128 |
| 124 | 130 |
|     | 132 |

204, 1628

MASS
STORAGE 112, 114, 116,
118, 1622

INPUT
DEVICE(S)

130, 200, 1620

INTERFACE 110, 134,
1624

OUTPUT
DEVICE(S)

1632

CODED
INSTRUCTIONS 106, 1626

NETWORK

132

| 200 | 218 | 602 |
| 202 | 220 | 604 |
| 208 | 224 | 606 |
| 214 | 226 | 614 |
| 216 | 228 | 616 |

METHODS, SYSTEMS, ARTICLES OF MANUFACTURE, AND APPARATUS TO DYNAMICALLY DETERMINE INTERACTION DISPLAY REGIONS FOR SCREEN SHARING

FIELD OF THE DISCLOSURE

This disclosure relates generally to video conferencing and, more particularly, to methods, systems, articles of manufacture, and apparatus to dynamically determine interaction display regions.

BACKGROUND

In recent years, video conference application usage has grown exponentially, becoming an indispensable tool for collaboration in many industrial, commercial, academic, and governmental environments. Generally, any type of electronic device capable of transmitting and/or receiving video and/or audio data via a network can be used to participate in a video conference. Video conferencing applications can allow a participant to share visual data to all participants, regardless of an electronic device on which an intended audience views the visual data.

BRIEF DESCRIPTION OF THE DRAWINGS

FIGS. 12-15 are flowcharts representative of example machine readable instructions and/or example operations that may be executed by example processor circuitry to implement the video conference circuitry of FIGS. 1, 2, and/or 6.

Figure 1:
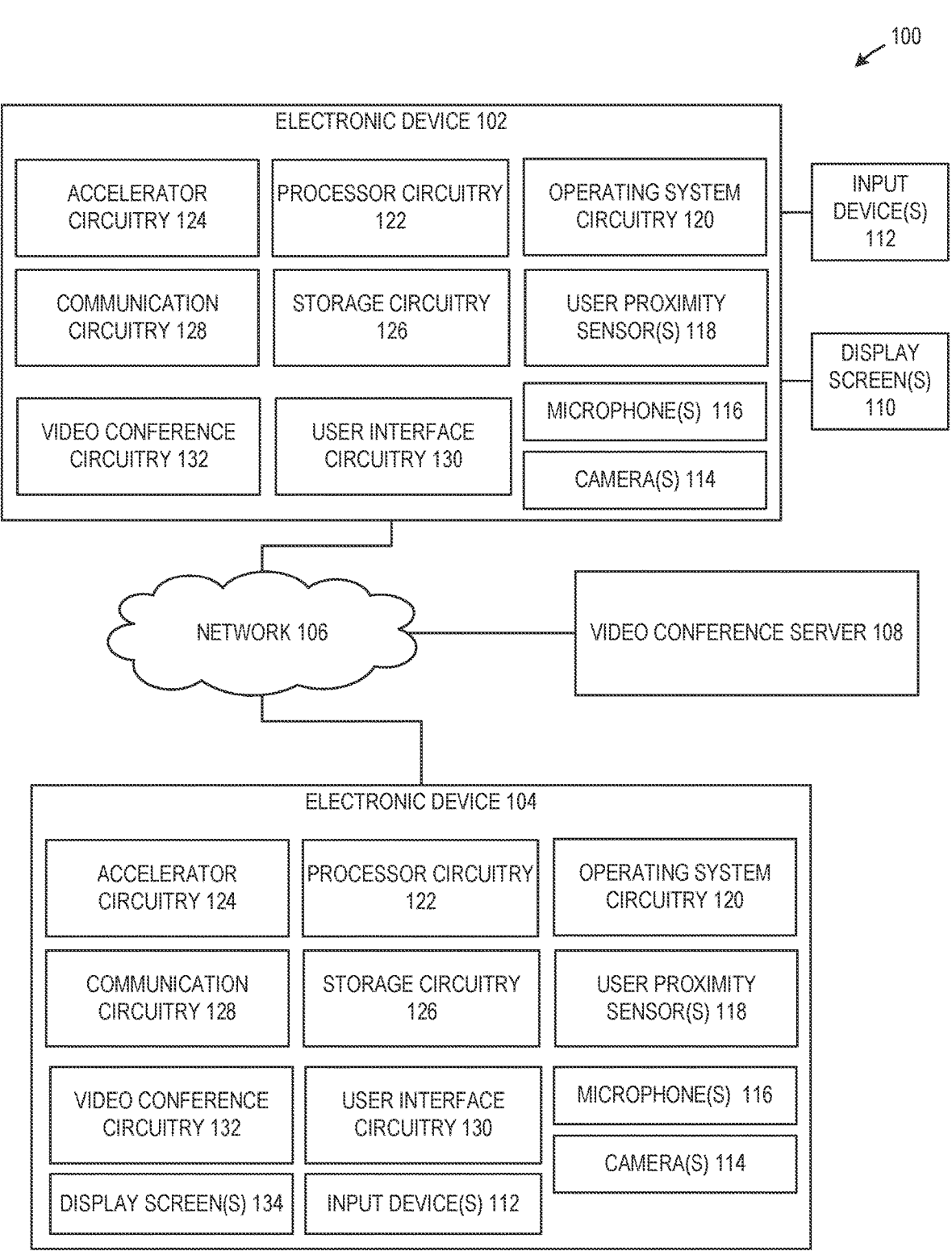
FIG. 1 is a block diagram of an example video conference environment in which example disclosed herein may be implemented.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Video conference applications enable two or more participants located anywhere in the world to communicate using video and audio data via one or more separate electronic devices. Video conference participants can use any number of different electronic devices during a video conference. For example, a first participant can utilize a personal computer communicatively coupled to a monitor having a relatively large display screen (e.g., 24 inches), while a second participant may use a tablet having a smaller display screen (e.g., 10 inches). Further, video conference participants can utilize electronic devices having different display screen characteristics such as, but not limited to, different resolutions, aspect ratios, and absolute screen sizes (e.g., diagonal measurement, length, width, etc.). Such flexibility allows a wide variety of users with different types of technology to simultaneously participate in a video conference.

Many video conference applications enable screen share (e.g., desktop share, display share), which is a technology that allows a participant to share screen content of one or more display screens in real-time with one or more separate devices of an intended audience. For example, a screen sharer participant (herein referred to as a presenter) can use an electronic device (e.g., transmitter device) to transmit audio data and/or image data corresponding to content rendered on a display screen(s) of an electronic device to other participants of the video conference (e.g., audience participants).

As disclosed herein, a transmitter device refers to an electronic device used by a presenter during a video conference to transmit content (e.g., audio data, image data, video data, etc.) to audience participants. A transmitter screen refers to a display screen(s) of a transmitter device that includes screen share content (e.g., content rendered on a display screen that is transmitted to other participants during a video conference). Screen share content can include all elements on the transmitter screen, one or more windows rendered on the transmitter screen, a specific application(s), etc. A receiver device as disclosed herein refers to an electronic device used by an audience participant during a screen share event to receive transmitted content. Similarly, a receiver screen refers to a display screen of a receiver device that is used to render screen share content received from a transmitter device for view by an audience participant. During a screen share event, a receiver device renders received screen share content in accordance with parameters (e.g., characteristics, setting, etc.) of a corresponding receiver screen.

Typically, a presenter is oblivious to types of electronic devices and/or display screens used by audience participants and how transmitted screen share content is consumed at a receiver device. As such, the presenter often transmits screen share content using settings convenient to the presenter alone. Such a scenario may not be an issue when a transmitter screen is of a smaller size or lower resolution than a receiver screen of higher resolution and larger size. However, problems can arise when screen share content transmitted at a particular resolution and intended for a certain aspect ratio and screen size is rendered on a receiver screen with a smaller aspect ratio and/or screen size. For example, screen share content from a transmitter screen that is large and/or of high resolution compared to a receiver screen can result in appearance issues when the screen share content renders on the receiver screen, such as magnification issues, distortion, etc. In some examples, screen share content from a larger transmitter screen that renders on a smaller receiver screen may cause the screen share content to appear distant (e.g., small) to an audience participant, resulting in difficult to view or otherwise unintelligible content. In some examples, the screen share content that includes image and/or video content may appear distorted on the receiver screen. Such issues can result in difficult to read content for the audience participant and/or a bad or otherwise undesirable user experience. During a video conference and/or screen share event, user experience can vary across receiver devices, depending on parameters or respective receiver screens.

The foregoing issues are mainly concerned with an environment in which a transmitter device having a transmitter screen(s) that is relatively large and/or has a relatively high resolution(s) transmits video data to a receiver device having a receiver screen(s) that is relatively small and/or has a relatively low resolution(s). As disclosed herein, a small receiver screen refers to a receiver screen that is relatively small in size and/or aspect ratio and/or has a low resolution as compared to a transmitter screen from which rendered screen share content originates. While it may be possible for an audience participant to manually adjust an appearance of rendered screen share content by, for example, adjusting local resolutions, zooming into screen share content, scrolling through screen share content, etc., such manual adjustments can be inconvenient for an audience participant. For example, the audience participant may need to make assumptions about which region of the screen share content the presenter is focusing on and, if zoomed in, may need to scroll through the screen share content to identify a region that is actively being discussed. In some such examples, an audience participant may need to continually make adjustments during the video conference, further reducing user experience. In some examples, manual adjustment may not be possible, depending on a type of video conference application being used. Thus, a technological solution is needed that (e.g., automatically) adjusts received screen share content for render on a receiver device based on dynamically identified active interaction regions of a transmitter screen and an advantageous render size on a receiver screen.

Example methods, systems, articles of manufacture, and apparatus disclosed herein determine an interactive context (e.g., interaction intent) of a screen share event based on presenter interactions with the screen share content during a video conference. Interactivity refers to a dialog that occurs between a user and a computer (e.g., user input, device processes, output). Context refers to information that can be used to characterize a situation (e.g., a video conference, a screen share event, etc.) of an entity, such as a user or a computer. For example, user input data (e.g., information) relative to a display screen (e.g., an entity) during a screen share event (e.g., the situation) would be context. As disclosed herein, an interactive context refers to a user's intent to present (e.g., show and/or discuss) specific content. Examples disclosed herein obtain and analyze user input data and/or user-related data relative to the screen share content to predict a presenter's intent to present specific content during the screen share event. User related data refers to data collected by the electronic device during the screen share event that is based on the presenter's action, such as eye tracking data, audio data and/or language data, etc. Thus, the presenter's intent to present specific content is based on the presenter interactions with the screen share content, which is represented in the user input data and/or the user-related data. For example, the presenter could be interacting with screen share content by entering additional content (e.g., typing in an application, drawing, etc.), removing content, reading content (e.g., from a slide), discussing (e.g., talking about) content, etc.

Certain examples determine the interactive context by analyzing inputs from various input devices in view of a type of screen share content to be transmitted, such as a type of application (e.g., a word processing application, a slide show presentation application, a web browser, database software, spreadsheet application, etc.). As disclosed herein, application contextual data includes information regarding which application(s) is active and/or being interacted with, information about the application(s) (e.g., a nature of the application), rules for determining an interactive context based on a specific application, etc. As disclosed herein, the nature of the application refers to a layout of a specific application in view of a type of the application. For example, an application may include multiple display regions that can be considered as related but separate from one another. During a presentation corresponding to the screen share event, the application can thus include different regions, some of which can be more important than other regions. For example, a coding application can include a main code window, a file(s) window, an editing window, etc. In some such examples, the main code window may be more important than the file window. By identifying a nature of the application, disclosed examples can identify potential regions of interaction and identify interaction within those regions. In certain examples, identifying the application and the nature of the application is important for dynamic determination of interactive context. In some examples, rules can be generated that determine which modality(ies) to use to identify the interactive context.

Examples disclosed herein determine the interactive context using different modalities. The different modalities may include a user's eye gaze and/or eye tracking (e.g., based on data from a camera), speech analysis applied to microphone input, human interface device (HID) input (e.g., via a mouse, a keyboard, touch screen, etc.) and corresponding operating system (OS) events, etc. For example, optical character recognition (OCR) could be applied to screen share content, such as a word document with text, to identify the presented text. Further, natural language processing (NLP) techniques may be applied to microphone input (e.g., corresponding to a presenter's voice) to generate language data (e.g., speech data), which can be compared to the OCR output to determine a portion of screen share content the presenter discussed. In some examples, HID input data and corresponding operating system (OS) events can be used to identify the interactive context. Examples disclosed herein can use a sequence of user input (e.g., time series data), location of the user input on the transmitter screen, and time between each user input to predict intended usage in combination with application contextual data to identify the interactive context.

Example transmitter devices disclosed herein utilize rules and/or artificial intelligence models to determine the interactive context based on collected data and/or other data (e.g., parameters of the transmitter screen, the nature of the application, etc.). Disclosed transmitter devices identify an active region(s) of interest (e.g., active interaction region) on a transmitter screen (e.g., in real time) as part of the interactive context. In some examples, an active interaction region is a portion of a transmitter screen(s) and content thereon that a presenter is looking at, discussing and/or otherwise interacting therewith at a given moment in time. For example, coordinates of the active interaction region can be identified using coordinates of a transmitter screen(s) (e.g., based on a monitor configuration and/or which monitor is used for screen sharing, etc.). Some examples generate interaction metadata that includes a determined interactive context and an identified active interaction region(s), which includes coordinates of the region(s) of interest relative to a corresponding screen share content on the transmitter screen(s).

Example methods, systems, articles of manufacture, and apparatus disclosed herein transmit a video conference transport stream (e.g., data packet) that includes complete (e.g., full, entire, whole, etc.) screen share content (e.g., frame(s), image data, etc.) as rendered on a transmitter screen, along with interaction metadata and/or audio data to one or more receiving devices. In other words, example transmitter devices disclosed herein send a data packet(s) that includes full frames of screen share content (e.g., screen share frames) and interaction metadata that describes an active interaction region of the screen share frames at a given moment in time to a remote receiver device(s). Certain example transmitter devices send a multiplexed transport stream that includes encoded frames (e.g., screen share frames), interaction metadata to a receiver device(s), audio data, and/or image data (e.g., from a camera that captures an environment surrounding the transmitter device). In some examples, the data packet(s) sent by a transmitter device includes interaction metadata regardless of parameters of a receiver device(s).

Example receiver devices disclosed herein facilitate an improved user experience by rendering received screen share content on a receiver screen in accordance with a receiver screen's parameters. Example receiver devices can use the interaction metadata, receiving device metainformation, and/or other information to determine how to render screen share content such that an audience participant can consume relevant content (e.g., active interaction region(s)) at the viewing settings. For example, a receiver device may consider parameters of a receiving screen(s) (e.g., size, aspect ratio, resolution, etc.), user (e.g., audience participant) preferences, user distance from the receiving screen(s), user profile(s) and corresponding settings, etc. to determine how to render received data. In some examples, the receiver device(s) may utilize rules and/or artificial intelligence models to determine how to render the screen share content. Accordingly, a transmitter device can transmit a same data packet that includes screen share content and interaction metadata to a plurality of receiver devices, each of which can render the screen share content based on different in a manner that is advantageous to a respective audience participant.

Examples disclosed herein can be applied to transmitter devices that include multiple transmitter screens. For example, a presenter may utilize two or more monitors during a screen share event to present one or more windows and/or applications. The presenter may present different content across the monitors during a screen share event. Disclosed transmitter devices dynamically identify an interactive context that can include an active interaction region(s) (e.g., coordinates of an active area of interaction) across the transmitter screens, and send such information as metadata to a receiver device(s). A corresponding receiver device(s) can render relevant screen share content across transmitter screens based on the metadata, rendering active interaction regions dynamically during a video conference. Further, in a multi-receiver device environment, each receiver device can render relevant screen share content based on the metadata in accordance with each device's respective configuration. In some examples, a presenter can disable interaction display region detection and transmission for situations in which the presenter desires an audience to view a whole transmitter screen.

Some examples improve a user experience during streaming experience of video content during video conferencing calls. Some examples can improve the user experience with limited latency. For example, disclosed receiver devices and/or transmitter devices can include a hardware accelerator that can process data faster than a typical CPU, enabling increased processing with limited (e.g., reduced) latency. Disclosed examples can be applied to a recording of a video conference. For example, a video conference application server may be utilized to record a video conference and/or a screen share event. During the recorded screen share event, a transmitter device can generate interaction metadata that can be stored with the recording and dynamically rendered by a receiving device at another point in time.

While examples disclosed herein are discussed in terms of video conferences application, disclosed examples can be applied to other technological applications in additional and/or alternative examples. For example disclosed examples can be used by live stream applications, such as YouTube Live®, Twitch TV®, Instagram Livestream®, etc. Disclosed examples can be applied by surveillance systems, remote rendering systems, interactive remote laboratories, and/or any other real world application in which image data from a first source is rendered at a second source. Further, disclosed examples can be applied to any number of different events, such as video conference event, webinars, screen share events, streaming events (e.g., in which a transmitter device transmits a data stream to a server accessible by other electronic devices, enabling users of the other electronic devices to view the data stream), etc.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, neural network models are used. In general, machine learning models/architectures that are suitable to use in the example approaches disclosed herein will include recurrent neural networks (RNNs), convolution neural networks (CNNs), time series models, etc. However, other types of machine learning models could additionally or alternatively be used such as natural language processing (NLP) models, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using any amount and/or types of data, such as audio data, image data, etc. However, any other training algorithm may additionally or alternatively be used. Training is performed using hyperparameters that control how the learning is performed (e.g., a learning rate, a number of layers to be used in the machine learning model, etc.). In some examples re-training may be performed. Training is performed using training data. Because supervised training is used, the training data is labeled.

Once training is complete, the model is deployed for use as an executable construct that processes an input and provides an output based on the network of nodes and connections defined in the model. The model is stored at example video conference circuitry. The model may then be executed by the video conference circuitry.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is block diagram of an example video conference environment 100 for which disclosed examples may be implemented. The video conference environment 100 may be used when two or more clients want to share data streams amongst each other. The video conference environment 100 includes an example first (e.g., transmitter) electronic device 102, which is communicatively coupled to an example second (e.g., receiver) electronic device(s) 104 via an example network 106. The transmitter electronic device 102 and/or the receiver electronic device 104 can be, for example, a personal computing (PC) device such as a laptop, a desktop, an electronic tablet, a hybrid or convertible PC, a mobile telephone, etc.

The example network 106 may be implemented using any network over which data can be transferred, such as the Internet. The example network 106 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 106 is an enterprise network (e.g., within businesses, corporations, etc.), a home network, among others.

In the illustrated example of FIG. 1, the transmitter electronic device 102 and the receiver electronic device 104 are video conference clients that are communicatively coupled to an example video conference server 108 via the network 106. Each electronic device 102, 104 (e.g., client) may connect to a video conference using the video conference server 108. During a video conference, the video conference server 108 may maintain a list of which electronic devices 102, 104 are connected and each electronic device's 102, 104 capabilities.

The transmitter electronic device 102 is communicatively coupled to or otherwise includes an example display screen (s) 110. The display screen 110 of FIG. 1 is a relatively large monitor (e.g., 24 inch diagonal) that is communicatively coupled to the transmitter electronic device 102. However, the display screen(s) 110 can be any suitable display device in additional or alternative examples, such as a touchscreen display, a liquid crystal display (LCD), a projector, etc. In some examples, the transmitter electronic device 102 includes more than one display screen 110. For example, the transmitter electronic device 102 may be a laptop having a first display screen 110 (e.g., physically attached to the transmitter electronic device 102) and a second display screen 110 (e.g., the 24 inch monitor) communicatively coupled to the transmitter electronic device 102 (e.g., via a hardware interface (e.g., USB Port, etc.) and/or a wireless interface (e.g., Bluetooth, etc.)).

In some examples, the transmitter electronic device 102 includes external devices communicatively coupled to the transmitter electronic device 102, such as an example input device(s) 112. The input device(s) 112 may be a human interface device (HID) such as a keyboard, a mouse, a touchpad, a touch screen, headphones and/or ear buds with a microphone, etc. The example input device(s) 112 can be carried by the transmitter electronic device 102 and/or a separate device that is communicatively coupled to the transmitter electronic device 102. The input device(s) 112 allow the user to input selections, data, and other information to the electronic device 102 and/or components thereof.

The electronic device 102 includes an example camera(s) 114 or other image sensor(s) capable of capturing image data of an environment surrounding the transmitter electronic device 102. In some examples, the camera(s) 114 generates image data that is analyzed to detect, for example, a presence of the user proximate to the device, a region(s) of a display screen 110 at which the user is looking (e.g., eye-tracking), etc. The camera(s) 114 of the transmitter electronic device 102 can include one or more image sensors to capture image data of the surrounding environment in which the device 102 is located. In some examples, the camera(s) 114 includes a depth-sensing camera(s). In the example of FIG. 1, the camera(s) 114 is carried by the electronic device 102 such that when a user faces the display screen 110, the user is within a field of view of the camera(s) 114. For example, the camera(s) 114 can be carried by a bezel of the display screen 110.

The transmitter electronic device 102 also includes an example microphone(s) 116 or other audio sensor(s) to detect sounds in an environment in which the transmitter electronic device 102 is located. The microphone(s) 116 can be carried by the transmitter electronic device 102 and/or a separate device that is communicatively coupled to the transmitter electronic device 102.

In some examples, the transmitter electronic device 102 includes one or more user proximity sensor(s) 118 that provide a means for detecting a presence of a user relative to the transmitter electronic device 102. For example, the user proximity sensor(s) 118 may emit electromagnetic radiation (e.g., light pulses) and detect changes in the signal due to the presence of a person or object (e.g., based on reflection of the electromagnetic radiation (e.g., light pulses). In some examples, the user proximity sensor(s) 118 includes time-of-flight (TOF) sensors that measure a length of time for light to return to the sensor after being reflected off a person or object, which can be used to determine depth. The example user proximity sensor(s) 118 can include other types of depth sensors, such as sensors that detect changes based on radar or sonar data. In some instances, the user proximity sensor(s) 118 collects distance measurements for one or more (e.g., four) spatial regions (e.g., non-overlapping quadrants) relative to the transmitter electronic device 102. The user proximity sensor(s) 118 associated with each region provide distance range data for region(s) of the user's face and/or body corresponding to the regions. The electronic device 102 of FIG. 1 can include other types of sensor(s) to detect user interactions relative to content of the display screen(s) 110.

The transmitter electronic device 102 includes example operating system (OS) circuitry 120, which is implements an operating system of the electronic device 102. The OS circuitry 120 can implement or otherwise correspond to any suitable OS, such as Microsoft® Windows®, Linux®, etc. The OS circuitry 120 is structured to facilitate communication between an application that executes on the transmitter electronic device 102 and hardware components of the transmitter electronic device 102. For example, the OS circuitry 120 can act as an intermediary between a computer programs, such as a video conference application, and computer hardware, such as an input device 112.

The transmitter electronic device 102 includes example processor circuitry 122 which is a semiconductor-based hardware logic device(s) structured to execute machine readable instructions (e.g., software) including, for example, user applications, an operating system, etc. The processor circuitry 122 executes software to interpret and output response(s) based on user input event(s) (e.g., touch event(s), keyboard input(s), mouse input(s) etc.) via the display screen 110 and/or via external device (e.g., a keyboard, a mouse, etc.). The processor circuitry 122 may implement a central processing unit (CPU) of the electronic device 102, may include any number of cores, and may be implemented, for example, by commercially available processing circuitry. In some examples, the processor circuitry 122 is communicatively coupled to additional processing circuitry.

In some examples, the transmitter electronic device 102 includes example accelerator circuitry 124, which can implement a hardware accelerator such as an ASIC, FPGA, GPU, etc. In some examples, the accelerator circuitry 124 is configured to accelerate a process that would typically be executed by a general purpose processor (e.g., processor circuitry 122). In some examples, the accelerator circuitry 124 is implemented by logic circuitry to perform certain tasks more quickly and/or efficiently than can be done by a general purpose processor. In some examples, the accelerator circuitry 124 may be on-board the processor circuitry 122, in the same chip package as the processor circuitry 122 and/or in one or more separate packages from the processor circuitry 122.

The transmitter electronic device 102 includes example storage circuitry 126, which is structured to store data, such as programs, peripheral component data, an operating system, etc. In some examples, the storage circuitry 126 can store various data to be used by the processor circuitry 122 to perform functions, such as those disclosed herein. In some examples, the storage circuitry 126 can be one or more memory systems that include various types of computer memory. In some examples, the storage circuitry 126 may be implemented by a volatile memory (e.g., a Synchronous Dynamic Random Access Memory (SDRAM), a Dynamic Random Access Memory (DRAM), a RAMBUS Dynamic Random Access Memory (RDRAM), a double data rate (DDR) memory, such as DDR, DDR2, DDR3, DDR4, mobile DDR (mDDR), etc.)) and/or a non-volatile memory (e.g., flash memory, a hard disk drive (HDD), etc.).

The transmitter electronic device 102 includes example communication circuitry 128, which may be embodied as any communication circuit, device, or collection thereof, capable of enabling communications over the network 106 between the transmitter electronic device 102 and another electronic device (e.g., the video conference server 108, receiver electronic device 104, and/or another compute device). The communication circuitry 128 may be configured to use any one or more communication technology (e.g., wired or wireless communications) and associated protocols.

The example electronic device 102 of FIG. 1 includes example user interface circuitry 130, which is structured to enable a user to interact with the electronic device 102. For example, the user interface circuitry 130 includes a graphical user interface (GUI), an application display, etc., presented to a user on the display screen(s) 110, 134 in circuit with and/or otherwise in communication with the electronic device 102. In some examples, the user controls the electronic device 102, configures one(s) of the hardware, firmware, and/or software resources of the electronic device 102, etc., by the user interface circuitry 130. In some examples, the user interface circuitry 130 enables the electronic device 102 to obtain information from the user via an input device and provide information to the user via an output device, such as the display screen 110.

The transmitter electronic device 102 includes example video conference circuitry 132, which implements an example video conference application, video conference platform, or other component that enables a user to participate in a video conferencing meeting with other electronic device(s). A user may launch the video conference circuitry 132 via the user interface circuitry 130 to participate in a video conference event. The user may select to begin transmitting screen share content via the user interface circuitry during a video conference event. In some examples, the video conference circuitry 132 can be implemented by the processor circuitry 122, one or more applications executed by the processor circuitry 122, or any combination thereof.

Upon launching, the video conference circuitry 132 determines whether a video conference event has been initiated (e.g., by a user) via the user interface circuitry 130. In additional or alternative examples, a machine initiates the video conference event (e.g., based on a timer, calendar application, etc.). Upon a selection to join the video event, the video conference circuitry 132 captures data (e.g., audio data, image data, metadata, etc.) from the transmitter electronic device 102 for transport to one or more other electronic devices, such as a receiver electronic device(s) 104. The video conference circuitry 132 additionally or alternatively receives data from the one or more other electronic devices 104 for rendering by the transmitter electronic device 102.

During the video conference event, a user of the transmitter electronic device 102 may initiate and/or terminate a screen share event via the video conference circuitry 132 (e.g., via the user interface circuitry 130). As used herein, a screen share event refers to a time period between initiation of screen share by a user and termination of screen share by the user. Upon a selection to initiate the screen share event, the video conference circuitry 132 generates or otherwise obtains image data corresponding to the receiver display screen 110 for transport to the receiver electronic device(s) 104. That is, the video conference circuitry 132 periodically and/or aperiodically captures an image (e.g., frame) of screen capture content (e.g., herein referred to as a screen share frame(s)) rendered on the display screen 110. For example, the video conference circuitry 132 can capture screen share frames continually, at specific periods (e.g., frames per second, etc.), based on a trigger(s) (e.g., just as a change), etc.

During the screen share event, the video conference circuitry 132 of FIG. 1 determines (e.g., estimates, predicts, etc.) an interactive context (e.g., interactive intent, interactive classification, etc.), which represents an intention of a presenter relative to screen share content on a display screen 110. Such interactive context can be used to determine a portion of screen share content that the user is interacting with during the screen share event. The example video conference circuitry 132 determines an interactive context of the user with the screen share content during a screen share event based on a specific application(s) that is shared (e.g., a nature of the application(s)), input data received from components of the electronic device 102 (e.g., the camera 114, the microphone 116, the display screen 110 and/or the input device(s) 112), time series data (e.g., based on HID inputs and corresponding operating system events), etc. The example video conference circuitry 132 processes input data to determine the interactive context using any suitable technique, such as applying an AI/ML algorithm (e.g., model), rules, heuristics, processes, etc. The video conference circuitry 132 is discussed in further detail below.

The example video conference circuitry 132 identifies key regions (e.g., active interaction regions) of a display screen 110 from which screen share content originates (e.g., a transmitter screen) as part of the interactive context. The active interaction regions are relevant regions (e.g., coordinates) of a display screen 110 and content thereon of which a presenter interacting. Identification of an active interaction region of a transmitter screen is important for dynamic rendering by a receiver device because a receiver device uses such information to render screen share content in accordance with the receiving device's own metainformation to improve (e.g., optimize) video sharing/streaming during a video conferencing meeting.

The example video conference circuitry 132 generates and encodes video frames (e.g., image frames from the camera 114, screen capture frames, etc.) for a screen share event during the video conferencing event. The video conference circuitry 132 transmits a transport stream including encoded video data, audio data, and/or interaction metadata to other user devices(s) via the network 106. As noted above, the interaction metadata can includes an interactive context and corresponding active interaction regions. Thus, the transport stream include full screen share frames as well as interaction metadata, allowing the receiving device(s) 104 to use the interaction metadata and local display screen information and/or user preference settings to render the content on the receiving screen in an optimal way for the user to consume, as discussed in further detail below.

The example receiver electronic device 104 of FIG. 1 is an electronic tablet with video conference capabilities. It is understood, however, that the receiver electronic device 104 can be another type of electronic device in additional or alternative examples. The receiver electronic device 104, which is similar to the transmitter electronic device 102, includes the input device(s) 112, the camera(s) 114, the microphone(s) 116, the user proximity sensor(s) 118, the OS circuitry 120, the processor circuitry 122, the accelerator circuitry 124, the storage circuitry 126, the communication circuitry 128, and the video conference circuitry 132. However, the receiver electronic device 104 includes an example display screen(s) 134 that is carried by a housing of the receiver electronic device 104. In some examples, the display screen 134 can additionally or alternatively implement an input device(s) 112, such as a touchpad and/or keyboard presented via the display screen 134 of the receiver electronic device 104. The receiver electronic device 104 can include other (e.g., communicatively coupled) display screens 134 in additional or alternative examples. The display screen(s) 134 of FIG. 1 is relatively small (e.g., 16 inch diagonal size) as compared to the display screen(s) 110 of the transmitter electronic device 102.

The example video conference circuitry 132 as implemented by the receiving electronic device 104 is structured to receive a transport stream (e.g., from the transmitter electronic device 102 and/or the video conference server 108). In response, the video conference circuitry 132 demultiplexes the transport steam to produce audio data, video (e.g., image) data, and/or interaction metadata. The video conference circuitry 132 can decode the video data and to generate video frames. In some examples, the video frames include screen share frames as transmitted by the transmitter electronic device 102.

The video conference circuitry 132 utilizes the interaction metadata to determine an interactive context(s) and an action interaction region(s) (e.g., action interaction region coordinates). Based on metainformation of the display screen 134, the video conference circuitry 132 determines a render decision (e.g., whether to render the full screen share frames, whether to dynamically render the screen share content based on the active interaction regions, how to render the active interaction regions, etc.). For example, if the display screen 134 of the receiving electronic device 104 is larger and/or has a higher resolution than the display screen 110 of the transmitting electronic device 102, the video conference circuitry 132 may determine to render the full screen share frames. In some examples, if the display screen 134 of the receiving electronic device 104 is smaller and/or has a lower resolution than the display screen 110 of the transmitting electronic device 102, the video conference circuitry 132 may determine to render the screen share content in accordance with parameters of the display screen 134 using active interaction region coordinates.

When the video conference circuitry 132 determines to dynamically render the screen share content, the video conference circuitry 132 can use the interaction metadata to decide to advantageously render the screen share content to include the active interaction region(s) so the receiver audience participant can consume relevant content at the viewing settings that are advantageous based on the display screen 134 parameters (e.g., size and resolution) and/or the user's settings. In some examples, the video conference circuitry 132 obtains input data (e.g., user input data, user-related data, etc.) received from components of the electronic device 104 (e.g., the camera 114, the microphone 116, the display screen 110 and/or the input device(s) 112), time series data (e.g., based on HID inputs and corresponding operating system events), etc. The video conference circuitry 132 can process input data to determine a render decision using any suitable techniques, such as applying an AI/ML algorithm (e.g., model), rules, heuristics, processes, etc.

While the first electronic device 102 of FIG. 1 is a transmitter device that transmits screen share content to the second electronic device 104 of FIG. 1 during a video conference, the first electronic device 102 can be a receiver device in additional or alternative examples. For example, the first electronic device 102 may stop transmitting screen share content during a video conference. While the second electronic device 104 of FIG. 1 is a receiver device that receives screen share content from the first electronic device 102 of FIG. 1 during a video conference, the second electronic device 104 can be a transmitter device in additional or alternative examples. For example, the receiver device 104 may start transmitting screen share content to the first electronic device 102 and/or another electric device(s) during the video conference. The first electronic device 102 and the second electronic 104 may transmit between receiver and/or transmitter during a video conference event. In some examples, both the first electronic device 102 and the second electronic 104 may be receiver devices that receive screen share content from another electronic device.

Figure 2:
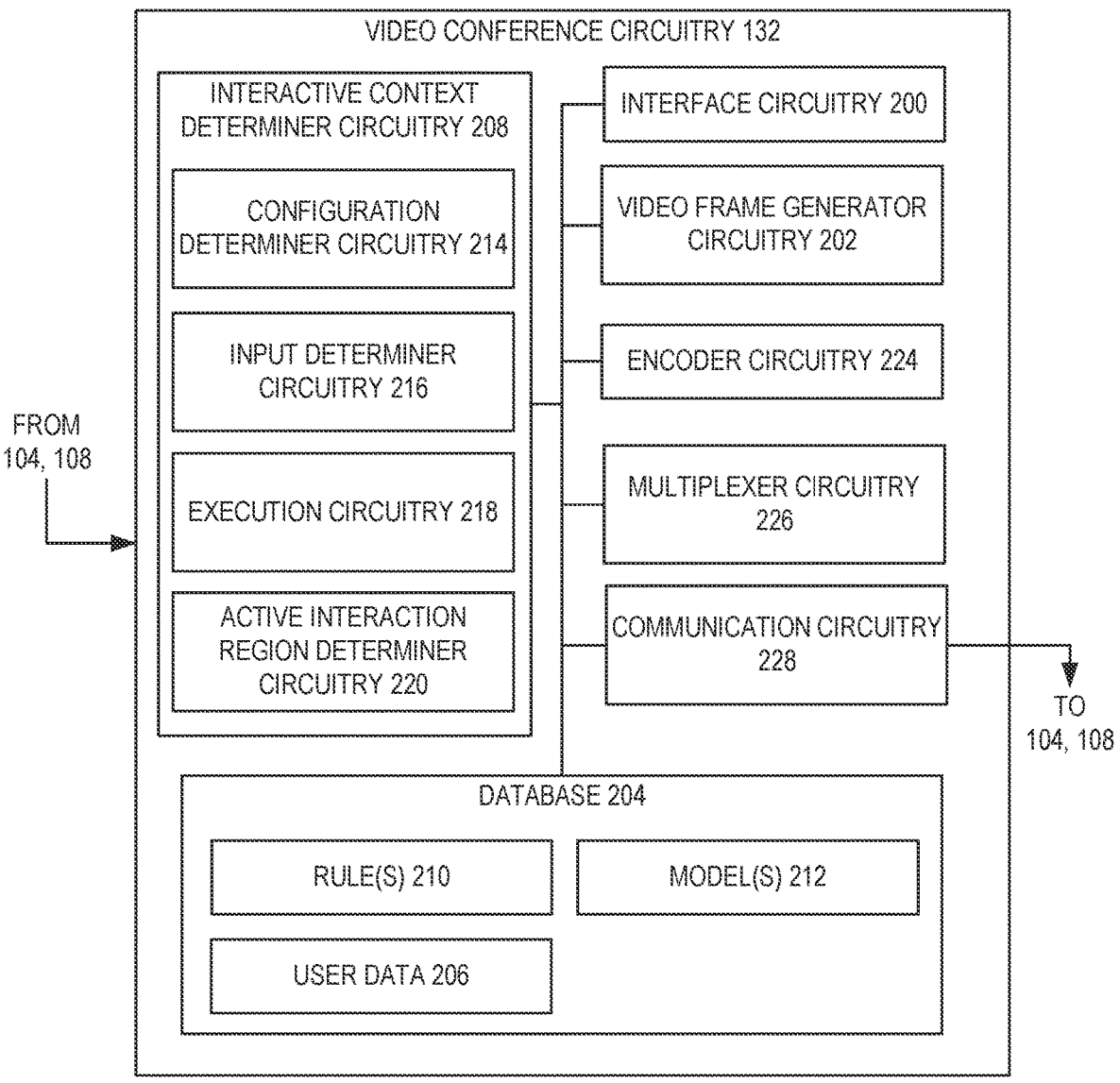
FIG. 2 is a block diagram of the example video conferencing circuitry of FIG. 1 as implemented by a transmitter device.

FIG. 2 is a block diagram of the video conference circuitry of FIG. 1 to facilitate a video conference event among electronic devices as implemented by a transmitter device. The video conference circuitry 132 of FIG. 2 may be instantiated (e.g., creating an instance of, bring into being for any length of time, materialize, implement, etc.) by processor circuitry such as a central processing unit executing instructions. Additionally or alternatively, the video conference circuitry 132 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The video conference circuitry 132 includes example interface circuitry 200, which is structured to provide an interface between the video conference circuitry 132 and other components of the electronic device 102. In some examples, the interface circuitry 200 is instantiated by processor circuitry executing interface instructions and/or configured to perform operations such as those represented by the flowchart of FIG. 12. The interface circuitry 200 enables the video conference circuitry 132 and/or components therefore to receive and/or retrieve data for use in determining an interactive context. For example, a user can make selections regarding the video conference circuitry 132 via the interface circuitry 200 (e.g., via the user interface circuitry 130 of FIG. 1), such as selecting to join a video conference event, initiating a screen share event, terminating such events, etc.

In some examples, the video conference circuitry 132 includes means for detecting initialization of a screen share event. For example, the means for detecting initialization of the screen share event may be implemented by the interface circuitry 200. In some examples, the interface circuitry 200 may be instantiated by processor circuitry such as the example processor circuitry 1612 of FIG. 16. For instance, the interface circuitry 200 may be instantiated by the example microprocessor 1700 of FIG. 17 executing machine executable instructions such as those implemented by at least blocks 1212-1214 of FIGS. 12-13. In some examples, the interface circuitry 200 may be instantiated by hardware logic circuitry, which may be implemented by an ASIC, XPU, or the FPGA circuitry 1800 of FIG. 18 structured to perform operations corresponding to the machine readable instructions. Additionally or alternatively, the interface circuitry 200 may be instantiated by any other combination of hardware, software, and/or firmware. For example, the interface circuitry 200 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes example video frame generator circuitry 202, which is structured to generate video frames corresponding to screen share content. In some examples, the video frame generator circuitry 202 is instantiated by processor circuitry executing video frame generator instructions and/or configured to perform operations such as those represented by the flowchart of FIG. 12. The video frame generator circuitry 202 generates the video frames to include in the transport stream of video and audio data for the video conferencing meeting. For example, the video frame generator circuitry 202 may generate video frames based on image data from the camera 114. In some examples, the video frame generator circuitry 202 generates frames based on screen share content (e.g., screen share frames, screen share images, etc.).

In some examples, the video conference circuitry 132 includes means for generating a screen share frame. For example, the means for generating the screen share frame may be implemented by the exampled video frame generator circuitry 202. In some examples, the video frame generator circuitry 202 may be instantiated by processor circuitry such as the example processor circuitry 1612 of FIG. 16. For instance, the video frame generator circuitry 202 may be instantiated by the example microprocessor 1700 of FIG. 17 executing machine executable instructions such as those implemented by at least blocks 1208 of FIG. 12. In some examples, the video frame generator circuitry 202 may be instantiated by hardware logic circuitry, which may be implemented by an ASIC, XPU, or the FPGA circuitry 1800 of FIG. 18 structured to perform operations corresponding to the machine readable instructions. Additionally or alternatively, the video frame generator circuitry 202 may be instantiated by any other combination of hardware, software, and/or firmware. For example, the video frame generator circuitry 202 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes an example database 204, which is structured to store information. For example, the database 204 of FIG. 2 can store user data 206, such as user profiles, user settings, and/or user preferences received via the interface circuitry 200. The example database 204 of FIG. 2 is implemented by any memor(ies), storage device(s) and/or storage disc(s) for storing data such as, flash memory, magnetic media, optical media, etc. Furthermore, the data stored in the example database 204 may be in any data format such as, for example, binary data, comma delimited data, tab delimited data, structured query language (SQL) structures, image data, etc.

The video conference circuitry 132 of FIG. 2 includes example interactive context determiner circuitry 208, which is structured to dynamically determine an interactive context (e.g., a user's interactive intent relative to screen share content on a display screens(s) 110). For example, the interactive context determiner circuitry 208 may identify an interactive context in response to determining that a screen sharing event is initiated (e.g., via the interface circuitry 200). In some examples, the interactive context determiner circuitry 208 is instantiated by processor circuitry executing interactive context determiner instructions and/or configured to perform operations such as those represented by the flowchart of FIG. 12. The interactive context determiner circuitry 208 determines interactive context from user interactions with screen share content and the contextual information using one or more modalities. The interactive context determiner circuitry 208 may obtain input data from devices that are communicatively coupled to the electronic device 102, such as the camera 114, microphone 116, input device(s) 110, etc. In some examples, the interactive context determiner circuitry 208 applies rules and/or ML algorithms (e.g., models) to determine the interactive context. For example, the interactive context determiner circuitry 208 can process input data and application contextual data using an ML model, heuristics, rules, policies, etc. Accordingly the database 204 includes example rules 210, which can include heuristics, policies, processes, etc.) and example models 212.

To facilitate determination of interactive context, the interactive context determiner circuitry 208 includes example configuration determiner circuitry 214, which is structured to determine display contextual data (e.g., display context) and application contextual data (application context). In some examples, the configuration determiner circuitry 214 is instantiated by processor circuitry executing configuration determiner instructions and/or configured to perform operations such as those represented by the flowchart of FIG. 12. In some examples, the configuration determiner circuitry 214 obtains the display contextual data and/or the application context data in response to a start (e.g., initialization, activation, initiation, etc.) of a screen sharing event.

The display (e.g., display-related) contextual data (e.g., information) can include a configuration of the electronic device 102, such a number of active display screens 110 (e.g., a display screen(s) 110 used to render screen share content) and corresponding parameters, user preferences concerning screen sharing events, current application usage, an application(s) that is being shared, etc. For example, the configuration determiner circuitry 214 may determine a number of display screens 110 (e.g., monitors) that are communicatively coupled to the electronic device 102. The configuration determiner circuitry 214 can determine which display screen(s) 110 is a transmitter screen (e.g., by determining which display screen(s) 110 is to be shared and/or which display screen(s) 110 includes an application(s) to be shared). In some examples, the configuration determiner circuitry 214 determines parameters for the electronic device 102 to be used for interactive context determination, such as a relevant camera(s)s 114 for eye tracking, a resolution, aspect ratio, and/or screen size(s) of a transmitter screen(s), etc.

In some examples, the configuration determiner circuitry 214 obtains the application (e.g., application-related) contextual data (e.g., information) in response to the start of a screen sharing event. The application contextual data can include information about a specific application that is presented in screen share content. In some examples, data used to determine an interactive context can depend on a nature of the application(s) that is being shared. Depending on the application being shared, certain portions of the screen share content can become more relevant than others. For example, a computer-aided design (CAD) application may include a design section, a tools section, and a file section. Typically, the design section is more important than the tools section and the file section. The configuration determiner circuitry 214 collects/obtains a sequence of application contextual data over a period of time (e.g., during the screen sharing event of the video conferencing meeting, until termination of the screen sharing event, etc.). Using application information also allows keyword matching using analysis from speech from the microphone.

The configuration determiner circuitry 214 obtains the application contextual data by identifying an application being interacted with during a screen sharing event and identifying any additional applications open on the electronic device 102. In some examples, the configuration determiner circuitry 214 determines application contextual data by identifying an application being presented during the screen share event and identifying rule(s) 210 for interactive context determination based on the application. For example, the database 204 can include rules for different applications for determining the interactive context based on the application.

The interactive context determiner circuitry 208 includes example input determiner circuitry 216, which is structured to obtain human interface device (HID) inputs and/or identify corresponding OS events. In some examples, the input determiner circuitry 216 is instantiated by processor circuitry executing input determiner instructions and/or configured to perform operations such as those represented by the flowchart of FIG. 12. The input determiner circuitry 216 obtains user inputs (e.g., user input data) from a presenter (e.g., via the interface circuitry 200) during a video conferencing meeting. In some examples, the input data includes HID inputs that are collected from HID devices (e.g., a mouse, a keyboard, a touchpad, etc.), such as the input device(s) 112 of FIG. 1. In some examples, the input data can include screen scrolling, user clicks and/or selections on a screen, etc. The example input determiner circuitry 216 collects or otherwise obtains a sequence (e.g., series) of user input data from the user over a period of time (e.g., during the screen sharing event, until termination of the screen sharing event, etc.).

In some examples, the input determiner circuitry 216 obtains operating system (OS) events corresponding to HID-related data (e.g., the HID inputs). For example, the OS events may include interrupts generated by hardware devices (e.g., interrupts triggered by a keystroke on a keyboard, mouse position, etc.), software interrupt instructions (e.g., an application program requesting reading or writing data to/from memory), or state changes in polling of input devices (e.g., the input device(s) 112 of FIG. 1) and/or application programs. The input determiner circuitry 216 identifies OS events on the electronic device 102 that correspond to the HID inputs identified by the input determiner circuitry 216 by obtaining the OS events executed in response to the obtained HID inputs. In some examples, the OS events are included in the user input data obtained by the example input determiner circuitry 216.

The interactive context determiner circuitry 208 processes the user input data, the display contextual information, the application contextual data (e.g., what application(s) are open and/or being interacted with), and/or other collected data (e.g., eye tracking data, etc.) using rules and/or a machine learning model to predict regions of screen sharing content to transmit (e.g., send) in a transport stream with video frames. Thus, the interactive context determiner circuitry 208 includes example execution circuitry 218, which is structured to execute a model(s) 212 and/or apply a rule(s) 210 to collected data. In some examples, at least some of the collected data is associated with a time stamp. For example, eye tracking data, user input data, OS event data, etc. can be associated with a time stamp. In some examples, the execution circuitry 218 is instantiated by processor circuitry executing execution instructions and/or configured to perform operations such as those represented by the flowchart of FIG. 12.

The execution circuitry 218 receives the display contextual data and the application contextual data from the configuration determiner circuitry 214. In some examples, the application context data is used to determine which model(s) 212 and/or rule(s) 210 to apply to determine the interactive context. In some examples, the application contextual information and/or the display configuration information are static variables that bias a model 212. For example, the display configuration information can include coordinates of screen share content that can be used to determine whether a presenter is sharing content from one display screen 110 over the another display screen 110. Such information can be used to limit a search area and/or pixels being searched to identify an interaction region.

In some examples, the execution circuitry 218 obtains time series data, including a sequence of user input, location on the screen, and time between each user input, from the input determiner circuitry 216. For example, the execution circuitry 218 can apply a time series model to the time series data in combination with the application (or applications) being interacted with to predict intended usage during the screen sharing event. The HID input (and the corresponding OS events) can be treated as a time series data set where sequences and patterns of different types of input as well as their location on the screen are analyzed by the execution circuitry 218. This allows for identification of location and patterns of input as well as time between consecutive input (or a series of input) to be analyzed. For example, the time series data could be used to determine whether a pointer of a mouse not within the screen share content (e.g., whether the mouse is off the transmitter display screen(s) 110. Depending on nature of user inputs (in terms of touch, mouse, etc.), if there is no change to mouse movement or click (or keyboard, touch, etc.), the execution circuitry 218 could disregard that modality. Different time series analysis techniques (e.g., methods) can be used, such as season trend decomposition, autoregressive, integrated, and/or moving average models and/or combinations thereof, such as an autoregressive integrated moving average (ARIMA), etc.

When content is presented and discussed by a presenter, it is possible to extract contextual information from speech input via a microphone. In some examples, the execution circuitry 218 can apply a computer vision based model 212, such as an OCR model 212 and/or an image recognition model 212 (e.g., depending on a type of application), to screen share content to identify (e.g., recognize) the screen share content. For example, the execution circuitry may apply an OCR model 212 to a word processing document, an image recognition model 212 to a photography application, and both an OCR model 212 and an image recognition model 212 to a slide share application. Further, the execution circuitry 218 can apply an NLP based model 212 to audio data from the microphone 116. For example, the execution circuitry 218 can receive the audio data from the microphone 116 and apply the NLP based model 212 to the audio data, enabling the execution circuitry 218 to perform speech recognition. The execution circuitry 218 may compare outputs of the NLP based model(s) 212 and/or other models 212 to determine interactive context while a presenter is talking about screen share content. Thus, the execution circuitry 218 can identify key words based on the screen share content and application being used, which can be mapped to regions of the screen share content to identify relevant regions and the interactive context.

In some examples, the execution circuitry 218 can apply an eye tracking model 212 and/or rule(s) 210 to video data from the camera 114 to determine interactive context based eye gaze and/or eye tracking of a presenter during the screen share event. For example, the execution circuitry 218 can receive image data from the camera 114 to track a user's eye gaze this a screen share event to identify locations of the screen being looked at during a presentation. This can be used to identify relevant regions of the screen being looked at by the presenter. In some examples, the execution circuitry 218 receives eye tracking and/or eye gaze data from another component of the electronic device, such as an image processing component. In some examples, eye tracking is a primary modality. For example, eye tracking and/or eye gaze data could be used to determine a region of the screen share content being looked at by the presenter to limit a search of screen share content using other modalities.

The example execution circuitry 218 of FIG. 2 uses obtained and/or generated information to identify the interactive context. For example, by applying a rule(s) 210 and/or interactive context determining model(s) 212 to obtained and/or generated data, the execution circuitry 218 determines a user's intent relative to the screen share content. As noted above, the type of data used to determine the interactive context can depend on the application being presented (e.g., a screen share application). For example, if the screen share application is a word document with text, speech becomes an important modality because the execution circuitry 218 can identify content within the text and identify which region of the screen share application is being spoken about using key words that are in the text in the document. If the screen share application includes a picture being discussed (e.g., a slide with a diagram), object detection would likely be more important than speech recognition. For example, if the presenter is discussing a picture of person with a dog, but is currently discussing the dog, the execution circuitry 218 could be used to identify a region of the image that includes the dog and use that information to build the interactive context.

In some examples, a user can select preferences for modalities used to determine an interactive context. For example, the user may choose to not use data from the camera 114 and/or microphone 116 for interactive context analysis. In some examples, the user may choose a main modality, such as input data and/or OS events. In some examples, the user may not input preferences and instead, allow the interactive context determiner circuitry 208 to determine modalities. In such examples, the interactive context determiner circuitry 208 is sufficiently intelligent to choose relevant modalities, drop modalities that are not relevant, and use information such as nature of application to identify the interactive context.

The interactive context determiner circuitry 208 includes example active interaction region determiner circuitry 220, which is structured to identify an active interaction region(s) of a display screen 110 (e.g., a region of the display screen being interacted with) based on the interactive context. In some examples, the active interaction region(s) is defined by coordinates within a screen share frame and/or within the display screen 110. In some examples, the active interaction region determiner circuitry 220 is instantiated by processor circuitry executing active interaction region determiner instructions and/or configured to perform operations such as those represented by the flowchart of FIG. 12. The active interaction region determiner circuitry 220 receives information corresponding to the interactive context and identifies coordinates within a full screen share frame that includes the active interaction region.

In some examples, a size of the active interaction region can vary. In some examples, the size of the active interaction region can depend on a nature of the content being shared. Some applications include separate sections that depict specific content. For example, a coding application can include a writing section (e.g., to input code), an execution section to show results, and/or other sections. Thus, if the interactive context indicates the presenter is interacting with the results section, the active interaction region determiner circuitry 220 can select the results section as the active interaction region. In such examples, the active interaction region coordinates correspond to coordinates of the results region. In some examples, the active interaction region determiner circuitry 220 identifies active interaction regions every few frames of the transmitted screen. In some examples, the active interaction region size can vary within an application. For example, a word processing application can include numerous paragraphs of different sizes. Thus, if the interactive context indicates the presenter is discussing a content of a specific paragraph, the active interaction region determiner circuitry 220 can select the corresponding paragraph as the active interaction region. In such examples, the active interaction region coordinates correspond to coordinates of the paragraph within the word processing application window.

The active interaction region determiner circuitry 220 is structured to generate interaction metadata that includes an interactive context(s) and corresponding active interaction region(s). In some examples, the metadata includes an indication of a video frame (e.g., camera frame, screen share frame, etc.) for which the metadata corresponds. For example, the interaction metadata an indication of a time associated with the interactive context and/or the active interaction region(s). The interaction metadata can be included in a transport stream along with full screen share frames. In some examples, the interaction metadata can be included in a transport stream along with each of every few frames of the transmitted screen.

In some examples, the video conference circuitry 132 includes means for determining an active interaction region relative to screen share content of a transmitter screen. For example, the means for determining the active interaction region may be implemented by the example interactive context determiner circuitry 208. In some examples, the interactive context determiner circuitry 208 may be instantiated by processor circuitry such as the example processor circuitry 1612 of FIG. 16. For instance, the interactive context determiner circuitry 208 may be instantiated by the example microprocessor 1700 of FIG. 17 executing machine executable instructions such as those implemented by at least blocks 1214 of FIGS. 12-13. In some examples, the interactive context determiner circuitry 208 may be instantiated by hardware logic circuitry, which may be implemented by an ASIC, XPU, or the FPGA circuitry 1800 of FIG. 18 structured to perform operations corresponding to the machine readable instructions. Additionally or alternatively, the interactive context determiner circuitry 208 may be instantiated by any other combination of hardware, software, and/or firmware. For example, the interactive context determiner circuitry 208 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

In some examples, the video conference circuitry 132 includes means for determining an interactive context relative to screen share content of a transmitter screen. For example, the means for determining the interactive context may be implemented by the example interactive context determiner circuitry 208. In some examples, the interactive context determiner circuitry 208 may be instantiated by processor circuitry such as the example processor circuitry 1612 of FIG. 16. For instance, the interactive context determiner circuitry 208 may be instantiated by the example microprocessor 1700 of FIG. 17 executing machine executable instructions such as those implemented by at least blocks 1214 of FIGS. 12-13. In some examples, the interactive context determiner circuitry 208 may be instantiated by hardware logic circuitry, which may be implemented by an ASIC, XPU, or the FPGA circuitry 1800 of FIG. 18 structured to perform operations corresponding to the machine readable instructions. Additionally or alternatively, the interactive context determiner circuitry 208 may be instantiated by any other combination of hardware, software, and/or firmware. For example, the interactive context determiner circuitry 208 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes example encoder circuitry 224, which is structured to encode the video frame(s) from the video frame generator circuitry 202. In some examples, the encoder circuitry 224 is instantiated by processor circuitry executing encoder instructions and/or configured to perform operations such as those represented by the flowchart of FIG. 12. The encoder circuitry 224 performs encoding (e.g., image compression) on the video frames to convert the video frames to a digital format that reduces the size of the video frame before transmitting over the network (e.g., network 106 of FIG. 1).

In some examples, the video conference circuitry 132 includes means for encoding video frames. For example, the means for encoding may be implemented by encoder circuitry 224. In some examples, the encoder circuitry 224 may be instantiated by processor circuitry such as the example processor circuitry 1612 of FIG. 16. For instance, the encoder circuitry 224 may be instantiated by the example microprocessor 1700 of FIG. 17 executing machine executable instructions such as those implemented by at least blocks 1214 of FIGS. 12-13. In some examples, the encoder circuitry 224 may be instantiated by hardware logic circuitry, which may be implemented by an ASIC, XPU, or the FPGA circuitry 1800 of FIG. 18 structured to perform operations corresponding to the machine readable instructions. Additionally or alternatively, the encoder circuitry 224 may be instantiated by any other combination of hardware, software, and/or firmware. For example, the encoder circuitry 224 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes example multiplexer circuitry 226, which is structured to generate a transport stream that includes full frames, audio data, and interactive context metadata. In some examples, the multiplexer circuitry 226 is instantiated by processor circuitry executing multiplexer instructions and/or configured to perform operations such as those represented by the flowchart of FIG. 12. In some examples, the multiplexer circuitry 226 receives data from a plurality of pipelines, such as a video pipeline, an audio pipeline, and/or an interaction metadata pipeline (e.g., the interactive content determine circuitry 208), which can be multiplexed into a transport stream.

The multiplexer circuitry 226 generates a transport stream (e.g., a standard digital container format for transmission and storage of audio data, video data, etc.) using the encoded video frames from the encoder circuitry 224, metadata corresponding to an interactive context and active interaction region coordinates, and/or audio data (e.g., from the microphone 116 and/or an audio pipeline). The multiplexer circuitry 226 combines audio data (e.g., an audio data packet), video data (e.g., a video packet that include the encoded video frames), and/or interaction metadata (e.g., an interaction metadata packet) to generate the transport stream. For example, the multiplexer circuitry 226 multiplexes the audio data and video data to generate the transport stream for the video conferencing meeting. The multiplexer circuitry 226 provides the generated transport stream to the example communication circuitry 228.

In some examples, the video conference circuitry 132 includes means for generating a transport stream. For example, the means for generating the transport stream may be implemented by the multiplexer circuitry 226. In some examples, the multiplexer circuitry 226 may be instantiated by processor circuitry such as the example processor circuitry 1612 of FIG. 16. For instance, the multiplexer circuitry 226 may be instantiated by the example microprocessor 1700 of FIG. 17 executing machine executable instructions such as those implemented by at least blocks 1216 of FIG. 12. In some examples, the multiplexer circuitry 226 may be instantiated by hardware logic circuitry, which may be implemented by an ASIC, XPU, or the FPGA circuitry 1800 of FIG. 18 structured to perform operations corresponding to the machine readable instructions. Additionally or alternatively, the multiplexer circuitry 226 may be instantiated by any other combination of hardware, software, and/or firmware. For example, the multiplexer circuitry 226 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes example communication circuitry 228, which is structured to implement a communication stack. In some examples, the communication circuitry 228 is instantiated by processor circuitry executing communication instructions and/or configured to perform operations such as those represented by the flowchart of FIG. 12. The example communication circuitry 228 generates a communication stack for the transport stream of the video conferencing meeting. The example communication circuitry 228 transmits the communication stack to other user devices participating in the video conferencing meeting via the network (e.g., the network 106 of FIG. 1).

In some examples, the video conference circuitry 132 includes means for transmitting a transport stream. For example, the means for transmitting the transport stream may be implemented by the communication circuitry 228. In some examples, the encoder circuitry 224 may be instantiated by processor circuitry such as the example processor circuitry 1612 of FIG. 16. For instance, the encoder circuitry 224 may be instantiated by the example microprocessor 1700 of FIG. 17 executing machine executable instructions such as those implemented by at least blocks 1214 of FIGS. 12-13. In some examples, the encoder circuitry 224 may be instantiated by hardware logic circuitry, which may be implemented by an ASIC, XPU, or the FPGA circuitry 1800 of FIG. 18 structured to perform operations corresponding to the machine readable instructions. Additionally or alternatively, the encoder circuitry 224 may be instantiated by any other combination of hardware, software, and/or firmware. For example, the encoder circuitry 224 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

Figure 3:
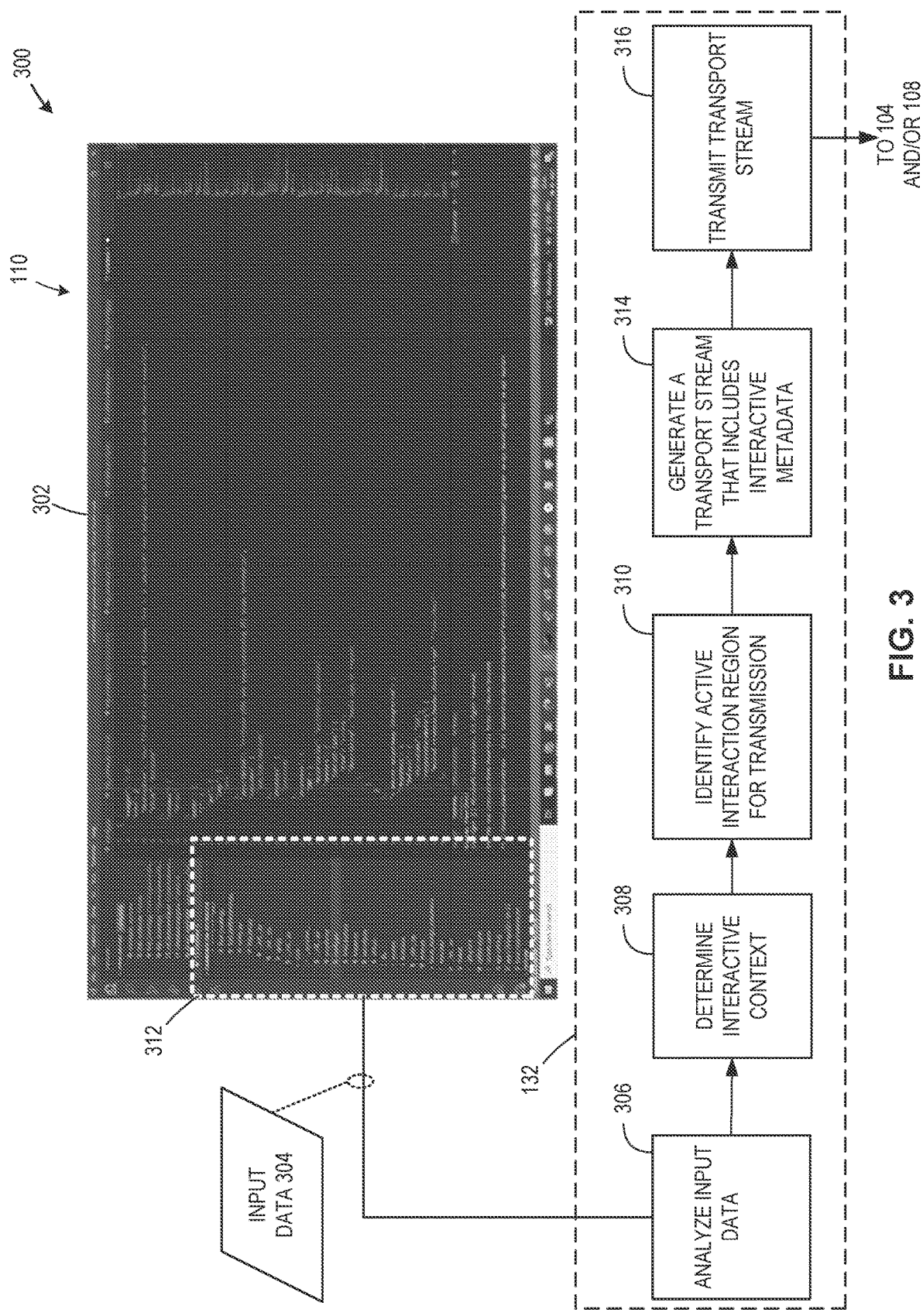
FIG. 3 is a schematic of an example screen sharing scenario of identifying active interaction regions for transmission.

FIG. 3 is a schematic illustration of an example screen share event 300 as implemented by the transmitter electronic device 102 and the video conference circuitry 132 of FIGS. 1 and 2. The screen share event 300 of FIG. 3 includes an example screen share frame 302 as rendered on the transmitter display screen 110. The screen share frame 302 of FIG. 3 illustrates a coding application window that is rendered on the display screen 110 during a video conference event.

In the illustrated example of FIG. 3, the example video conference circuitry 132 obtains input data 304 corresponding to data received from components of an electronic device 102, such as the input device(s) 112, the camera 114, the microphone 116, the user proximity sensor 118, etc. At block 306, the interactive context determiner circuitry 208 analyzes the input data 304 and/or other modalities (e.g., display contextual data, application contextual data, OS event data, user data, etc.). Based on the analysis, the interactive context determine circuitry 208 determines an interactive context (e.g., block 308). The active interaction region determiner circuitry 220 identifies an active interaction region for transmission and generates interaction metadata (e.g., block 310). The interaction metadata can include the interactive context and the active interaction region(s). FIG. 3 illustrates an example active interaction region 312 of the screen share frame 302. As illustrated in FIG. 3, the action interaction region 312 can be identified using coordinates of the screen share frame 302. In some examples, the screen share frame 302 and the interaction metadata are associated with time stamps.

At block 314, the example multiplexer circuitry 226 multiplexes the (e.g., encoded) screen share frame 302, the interaction metadata, and/or audio data to generate a transport stream. At block 316, the example communication circuitry 228 transmits the transport stream to the receiver electronic device 104 and/or to the video conference server 108 (e.g., which can transmit the transport stream to the receiver electronic device 104). In some examples, the communication circuitry 228 can transmit the transport stream to additional or alternative devices.

Figures 4, 5:
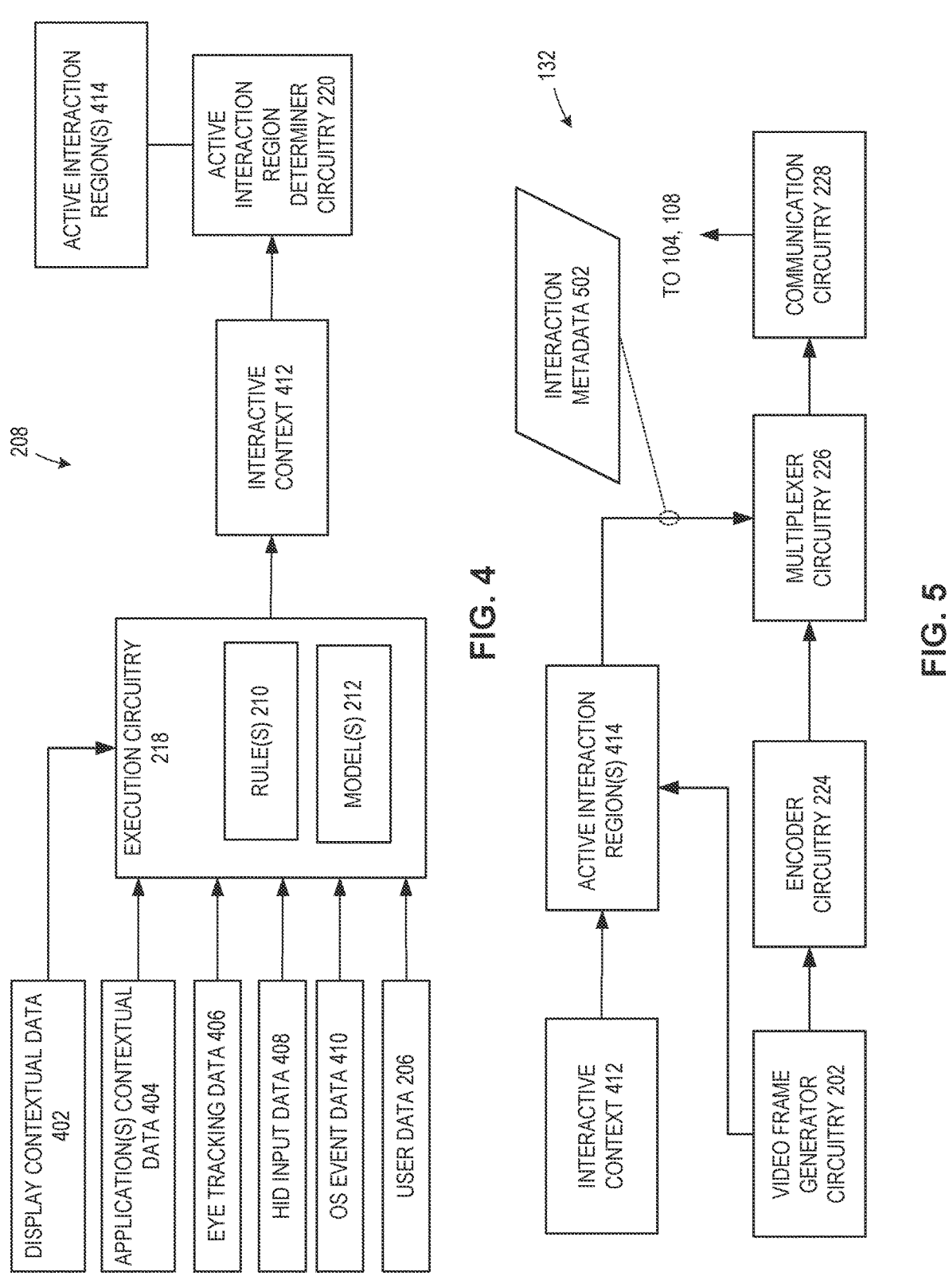
FIG. 4 illustrates an example of a process diagram of the interactive context determiner circuitry of FIG. 2.
FIG. 5 illustrates an example of a process diagram of the video conference circuitry of FIGS. 1 and 2 including the example interactive context determiner circuitry of FIG. 2.

FIG. 4 is a block diagram of an example implementation the interactive context determiner circuitry 208 of FIG. 2. As illustrated in FIG. 2, the interactive context determiner circuitry 208 includes the rule(s) 210 and the model(s) 212. The interactive context determiner circuitry 208 obtains (e.g., receives, retrieves, generates, etc.) example display contextual data 402, which can include screen share coordinates (e.g., coordinates of screen share content relative to a transmitter display screen 110). Further, the interactive context determiner circuitry 208 obtains example application contextual data 404, which includes an indication of which application(s) is presented in the screen share content, an application being interacted with, and/or other open applications. In some examples, the interactive context determiner circuitry 208 uses such information to determine which other data type(s) to collect. However, the interactive context determiner circuitry 208 may collect more or less data type(s) in additional or alternative examples.

In some examples, the interactive context determiner circuitry 208 obtains example eye tracking (e.g., eye gaze) data 406, example HID input data 408, example OS event data, and/or information regarding usage and/or screen sharing scenarios (e.g., based on a rule(s) 210, user data 206, etc.). The interactive context determiner circuitry 208 applies the rules/machine learning model for interactive context on the collected data 206, 402, 404, 406, 408, 410. The execution circuitry 218 processes the input data and the application contextual data with the interactive context model 212 to determine an interactive context 412 for the screen sharing event of the video conference event. In the example implementation of FIG. 4, the output of execution circuitry 218 is input into the active interaction region determiner circuitry 220, which performs active interaction region determiner selection to identify active interaction region(s) 414.

FIG. 5 is a block diagram of an example implementation of the video conference circuitry 132 of FIGS. 1 and 2. As illustrated in FIG. 2, the video frame generator circuitry 202 generates video frames from a screen sharing event (e.g., screen share frames). The video frame generator circuitry 202 transmits the generated screen share frames to the active interaction region determiner circuitry 220 to be used to identify the action interaction region(s) 414 for the screen share frames. The active interaction region determiner circuitry 220 determines the active interaction region(s) 414 and generates example interaction metadata 502 that includes the interactive context 412 and the active interaction region(s) 414. The active interaction region determiner circuitry 220 transmits the interaction metadata 502 to the multiplexer circuitry 226.

The video frame generator circuitry 202 also transmits the generated screen share frames to the encoder circuitry 224 for encoding. After encoding the screen share frames, the encoder circuitry 224 transmits the encoded screen share frames to the multiplexer circuitry 226. In some examples, audio data from an audio pipeline is transmitted to the multiplexer circuitry 226. The multiplexer circuitry 226 transmits the received data to generate a transport stream. The multiplexer circuitry 226 transmits the transport stream to the communication circuitry 228 to be send to the video conference server 108 and to receiving electronic devices 104.

Figure 6:
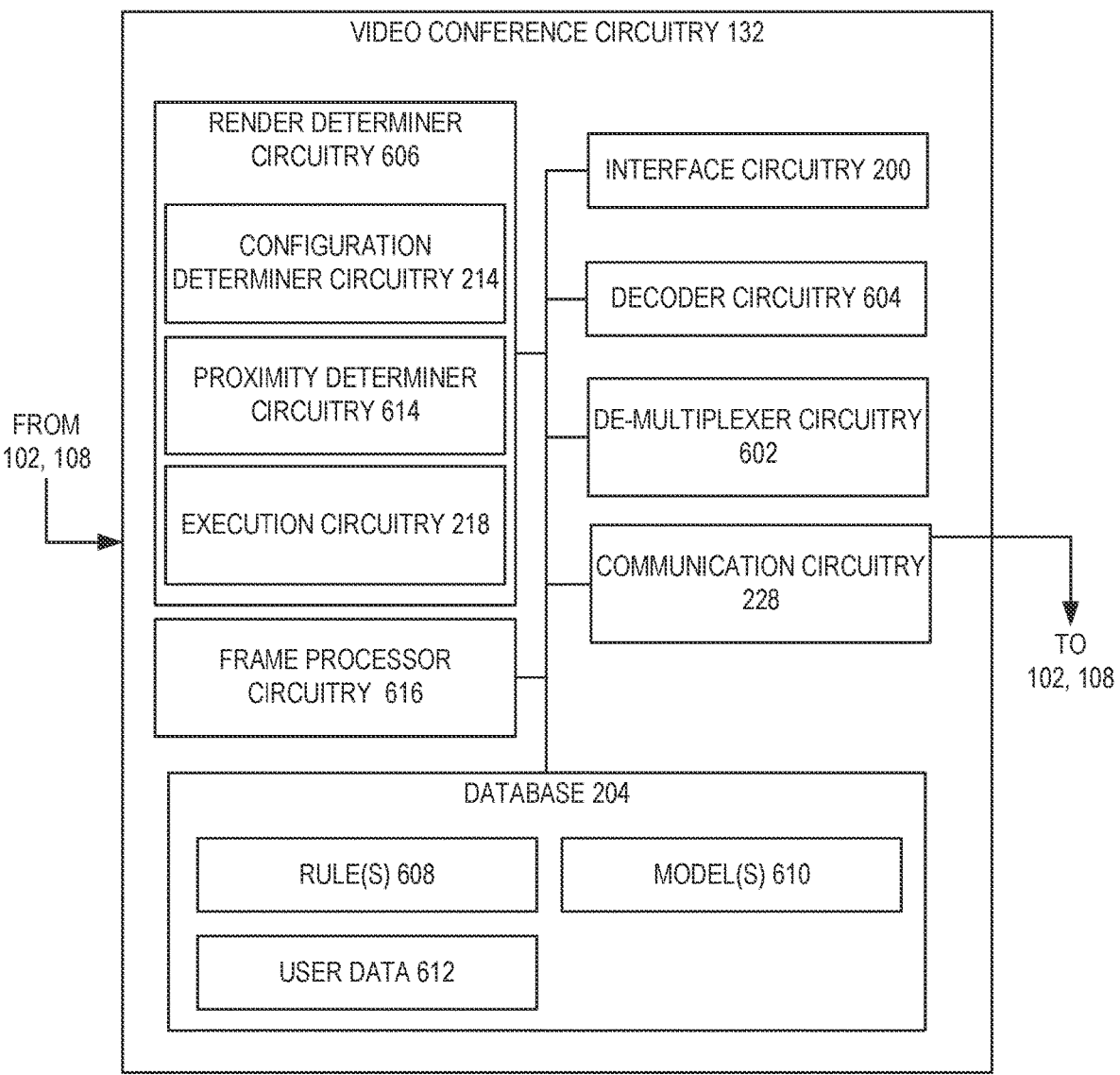
FIG. 6 is a block diagram of example video conferencing circuitry of FIG. 1 as implemented by a receiver device.

FIG. 6 is another block diagram of the video conference circuitry 132 of FIGS. 1 and 2 as implemented by a receiver device (e.g., receiver electronic device 104. The video conference circuitry 132 of FIG. 6 may be instantiated (e.g., creating an instance of, bring into being for any length of time, materialize, implement, etc.) by processor circuitry such as a central processing unit executing instructions. Additionally or alternatively, the video conference circuitry 132 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by microprocessor circuitry executing instructions to implement one or more virtual machines and/or containers.

The video conference circuitry 132 of FIG. 6 includes the example interface circuitry 200 of FIG. 2, which is structured to provide an interface between the video conference circuitry 132 and other components of the electronic device 104. The interface circuitry 200 enables the video conference circuitry 132 and/or components therefore to receive and/or retrieve data for use in determining an interactive context. For example, a user can make selections regarding the video conference circuitry 132 via the interface circuitry 200 (e.g., via the user interface circuitry 130 of FIG. 1), such as selecting to join a video conference event, initiating a screen share event, terminating such events, etc.

The video conference circuitry 132 includes the example communication circuitry 228, which is structured to implement a communication stack. In some examples, the communication circuitry 228 is instantiated by processor circuitry executing communication instructions and/or configured to perform communication operations such as those represented by the flowchart of FIG. 14. The communication circuitry 228 of FIG. 6 is structured to receive a transport stream (e.g., from the transmitter electronic device 102 and/or the video conference server 108).

The video conference circuitry 132 includes example de-multiplexer circuitry 602, which is structured to separate components of a transport stream, such as full frames, audio data, and interactive context metadata. In some examples, the de-multiplexer circuitry 602 is instantiated by processor circuitry executing de-multiplexer instructions and/or configured to perform operations such as those represented by the flowchart of FIG. 12. For example, the de-multiplexer circuitry 602 receives the transport stream and separates data (e.g., audio data, image data, interaction metadata, etc.) in the transport stream into corresponding pipelines. For example, the de-multiplexer circuitry 602 send audio data to an audio pipeline. In some examples, the de-multiplexer circuitry 602 sends image data to example decoder circuitry 604. In some examples, the de-multiplexer circuitry 602 sends interaction metadata to example render determiner circuitry 606.

In some examples, the video conference circuitry 132 includes means for separating a transport stream. For example, the means for separating the transport stream may be implemented by demultiplexer circuitry 602. In some examples, the demultiplexer circuitry 602 may be instantiated by processor circuitry such as the example processor circuitry 1612 of FIG. 16. For instance, the demultiplexer circuitry 602 may be instantiated by the example microprocessor 1700 of FIG. 17 executing machine executable instructions such as those implemented by at least block 1404 of FIG. 14. In some examples, the demultiplexer circuitry 602 may be instantiated by hardware logic circuitry, which may be implemented by an ASIC, XPU, or the FPGA circuitry 1800 of FIG. 18 structured to perform operations corresponding to the machine readable instructions. Additionally or alternatively, the demultiplexer circuitry 602 may be instantiated by any other combination of hardware, software, and/or firmware. For example, the demultiplexer circuitry 602 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes the example decoder circuitry 604, which is structured to decode a series of frames. In some examples, the decoder circuitry 604 is instantiated by processor circuitry executing decoder instructions and/or configured to perform operations such as those represented by the flowchart of FIG. 12. In some examples, the decoder circuitry 604 decodes video frames from a camera 114. In additional or alternative examples, the decoder circuitry 604 decodes screen share frames corresponding to a screen share event. In some examples, the decoder circuitry 604 decodes the frames by applying a decoding algorithm to the encoded frames.

In some examples, the video conference circuitry 132 includes means for decoding an image. For example, the means for decoding the image may be implemented by the example decoder circuitry 604. In some examples, the decoder circuitry 604 may be instantiated by processor circuitry such as the example processor circuitry 1612 of FIG. 16. For instance, the decoder circuitry 604 may be instantiated by the example microprocessor 1700 of FIG. 17 executing machine executable instructions such as those implemented by at least block 1406 of FIG. 14. In some examples, the decoder circuitry 604 may be instantiated by hardware logic circuitry, which may be implemented by an ASIC, XPU, or the FPGA circuitry 1800 of FIG. 18 structured to perform operations corresponding to the machine readable instructions. Additionally or alternatively, the decoder circuitry 604 may be instantiated by any other combination of hardware, software, and/or firmware. For example, the decoder circuitry 604 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes example render determiner circuitry 606, which is structured to dynamically determine how to render received screen share content based on interactive context metadata and a configuration of the electronic device 104. In some examples, the example render determiner circuitry 606 is instantiated by processor circuitry executing render determiner instructions and/or configured to perform operations such as those represented by the flowchart of FIG. 12.

The video conference circuitry includes the example database 204 of FIG. 2, which is structured to store information. The database 204 of FIG. 6 further includes example rule(s) 608, example model(s) 610, and example user data 612. For example, the user data 612 may include user preferences for rendering screen share content in accordance with parameters of the display screen(s) 134. In some examples, the user data 612 includes a user profile(s) and/or user setting(s) pertaining to the video conference circuitry 132.

The render determiner circuitry 606 includes the example configuration determiner circuitry 214, which is structured to determine display contextual data. For example, the display contextual data can include a configuration of the electronic device 104, such a number of active display screen(s) 134 and corresponding parameters, corresponding parameters, user preferences concerning screen sharing events, etc. For example, the configuration determiner circuitry 214 may determine a number of display screens 110 (e.g., monitors) that are communicatively coupled to the electronic device 104, which display screen(s) 134 is a receiver screen (e.g., by determining which display screen(s) 134 is to render a screen share frame), etc. In some examples, the configuration determiner circuitry 214 determines parameters for the electronic device 104 to be used render decision determination, such as a relevant sensor(s) 118, a resolution, aspect ratio, and/or screen size(s) of a receiver screen(s), etc.

The render determiner circuitry 606 includes the example proximity determiner circuitry 614, which is structured to determine a distance of an audience participant to a relevant receiver screen 134. In some examples, the proximity determiner circuitry 614 is instantiated by processor circuitry executing input determiner instructions and/or configured to perform operations such as those represented by the flowchart of FIG. 15. The proximity determiner circuitry 614 monitors the user proximity sensor(s) 118 of FIG. 1 to identify a proximity (e.g., distance) of the audience participant to the receiver screen 134. For example, the proximity determiner circuitry 614 can obtain sensor data (e.g., signals output by) from the user proximity sensor(s) 118. The proximity determiner circuitry 614 can use the sensor data to identify a distance of the user from the receiver screen 134 and/or receiver electronic device 104. In some examples, the proximity determiner circuitry 614 transmits the distance to example execution circuitry 218.

The video conference circuitry 132 includes example execution circuitry 218, which is structured to apply a rule(s) 608 and/or execute a model(s) 610. In some examples, the execution circuitry 218 is instantiated by processor circuitry executing model execution instructions and/or configured to perform operations such as those represented by the flowcharts of FIGS. 15-16. In some examples, the execution circuitry 218 obtains (e.g., receives and/or retrieves) data from components of the electronic device 104 and/or video conference circuitry 132. For example, the execution circuitry 218 receives the interactive context and active interaction region(s) (e.g., from the interactive metadata), display parameters corresponding to the display screen(s) 134, user proximity data from the user proximity sensor(s) 118 and/or the proximity determiner circuitry 614, user data 206, etc. The example execution circuitry 218 applies a rule(s) 608 and/or executes a model(s) 610 based on the data to generate a render decision. For example, the render decision can include instructions to render the entire screen share frame (e.g., if the display screen 134 is of similar size and resolution to the screen share frame). In some examples, the render decision can include instructions to render a portion of the screen share frame corresponding to the active inter- action region. In some such examples, the portion may be the active interaction region. In some examples, the portion may include the active interaction region and a region adjacent the active interaction region (e.g., based on a size of the active interaction region and an aspect ratio of the display screen 134). The render decision can include other instructions in additional or alternative examples.

In some examples, the video conference circuitry 132 includes means for generating (e.g., determining) a render decision. For example, the means for generating the render decision may be implemented by the example render deter- miner circuitry 606. In some examples, the render deter- miner circuitry 606 may be instantiated by processor circuitry such as the example processor circuitry 1612 of FIG. 16. For instance, the render determiner circuitry 606 may be instantiated by the example microprocessor 1700 of FIG. 17 executing machine executable instructions such as those implemented by at least blocks 1410 and 1502-1512 of FIGS. 14-15. In some examples, the render determiner circuitry 606 may be instantiated by hardware logic cir- cuitry, which may be implemented by an ASIC, XPU, or the FPGA circuitry 1800 of FIG. 18 structured to perform operations corresponding to the machine readable instructions. Additionally or alternatively, the multiplexer circuitry 226 may be instantiated by any other combination of hard- ware, software, and/or firmware. For example, the render determiner circuitry 606 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instructions without executing software or firmware, but other structures are likewise appropriate.

The video conference circuitry 132 includes example frame processor circuitry 616, which is structured to process decoded screen share frames based on a render decision for render on the display screen(s) 134. In some examples, the frame processor circuitry 616 is instantiated by processor circuitry executing video frame generator instructions and/ or configured to perform operations such as those repre- sented by the flowchart of FIG. 14. For example, the frame processor circuitry 616 process the screen share frame by identifying a portion of the screen share frame that includes the active interaction region and providing the portion of the screen share frame for render on the display screen 134. In some examples, the frame processor circuitry 616 crops a screen share frame based on an active interaction region. For example, the frame processor circuitry 616 may crop the screen share frame to the coordinates of the active interac- tion region. In some examples, the frame processor circuitry 616 may crop the screen share frame to include the coordi- nates of the active interaction region and an area adjacent the active interaction region.

In some examples, the video conference circuitry 132 includes means for processing a screen share frame. For example, the means for processing the screen share frame may be implemented by the example frame processor cir- cuitry 616. In some examples, the frame processor circuitry 616 may be instantiated by processor circuitry such as the example processor circuitry 1612 of FIG. 16. For instance, the multiplexer circuitry 226 may be instantiated by the example microprocessor 1700 of FIG. 17 executing machine executable instructions such as those implemented by at least block 1412 of FIG. 14. In some examples, the frame processor circuitry 616 may be instantiated by hardware logic circuitry, which may be implemented by an ASIC, XPU, or the FPGA circuitry 1800 of FIG. 18 structured to perform operations corresponding to the machine readable instructions. Additionally or alternatively, the frame proces- sor circuitry 616 may be instantiated by any other combi- nation of hardware, software, and/or firmware. For example, the frame processor circuitry 616 may be implemented by at least one or more hardware circuits (e.g., processor circuitry, discrete and/or integrated analog and/or digital circuitry, an FPGA, an ASIC, an XPU, a comparator, an op-amp, a logic circuit, etc.) structured to execute some or all of the machine readable instructions and/or to perform some or all of the operations corresponding to the machine readable instruc- tions without executing software or firmware, but other structures are likewise appropriate.

While an example manner of implementing the video conference circuitry 132 of FIG. 1 is illustrated in FIGS. 2 and/or 6, one or more of the elements, processes, and/or devices illustrated in FIGS. 2 and/or 6 may be combined, divided, re-arranged, omitted, eliminated, and/or imple- mented in any other way. Further, the example interface circuitry 200, example interactive context determiner cir- cuitry 208, example configuration determiner circuitry 214, example input determiner circuitry 216, example execution circuitry 218, example active interaction region determiner circuitry 220, example video frame generator circuitry 202, example encoder circuitry 224, example multiplexer cir- cuitry 226, example communication circuitry 228, example de-multiplexer circuitry 602, example decoder circuitry 604, example render determiner circuitry 606, example frame processor circuitry 616, and/or, more generally, the example video conference circuitry 132 of FIG. 1, may be imple- mented by hardware alone or by hardware in combination with software and/or firmware. Thus, for example, any of the example interface circuitry 200, example interactive context determiner circuitry 208, example configuration determiner circuitry 214, example input determiner circuitry 216, example execution circuitry 218, example active interaction region determiner circuitry 220, example video frame gen- erator circuitry 202, example encoder circuitry 224, example multiplexer circuitry 226, example communication circuitry 228, example de-multiplexer circuitry 602, example decoder circuitry 604, example render determiner circuitry 606, example frame processor circuitry 616, and/or, more gen- erally, the example video conference circuitry 132, could be implemented by processor circuitry, analog circuit(s), digital circuit(s), logic circuit(s), programmable processor(s), pro- grammable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example video conference circuitry 132 of FIG. 1 may include one or more elements, processes, and/or devices in addition to, or instead of, those illustrated in FIGS. 2 and/or 6, and/or may include more than one of any or all of the illustrated elements, processes and devices.

Figures 7, 8:
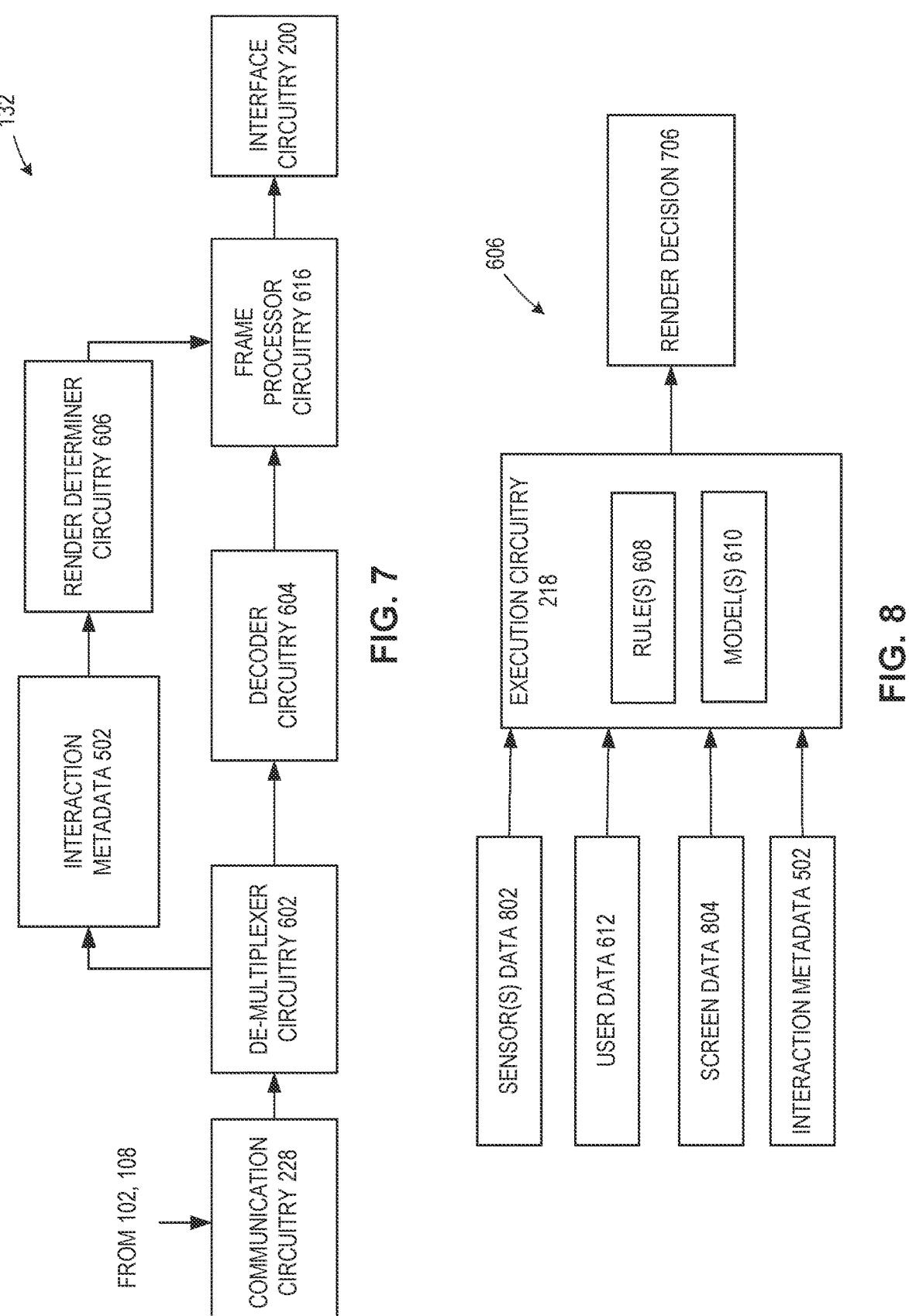
FIG. 7 illustrates an example of a process diagram of the video conferencing circuitry of FIGS. 1 and 6 including the example render determiner circuitry of FIG. 6.
FIG. 8 illustrates an example of a process diagram of the render determiner circuitry of FIG. 2.

FIG. 7 is a block diagram of an example implementation of the video conference circuitry 132 of FIGS. 1 and 2. As illustrated in FIG. the communication circuitry 228 receiving the transport stream from the transmitter electronic device 102. The communication circuitry 228 transmits the transport stream to the de-multiplexer circuitry 602 to be de-multiplexed. The de-multiplexer circuitry 602 transmits encoded screen share frames from the decoder circuitry 604 for decoding. By decoding the screen share frames, the decoder circuitry 604 generates the screen share frames, which are transmitted to the frame processor circuitry 616. In some examples, the de-multiplexer circuitry 602 transmits audio data to an audio pipeline. The de-multiplexer circuitry 602 transmits the interaction metadata 502 to the render determiner circuitry 606.

Referring now to FIG. 8, which illustrates an example implementation of the render determiner circuitry 606 of FIG. 6 in accordance with the teachings of this disclosure. The render determiner circuitry 606 obtains the interaction metadata 502 from the de-multiplexer circuitry 602. The render determiner circuitry 606 also receives example sensor(s) data 802, which can include data from the camera 114, the user proximity sensor 118, and/or another sensor(s) coupled to the receiver electronic device 104. The render determiner circuitry 606 also receives screen data 804, which includes information pertaining to the receiver display screen(s) 134, such as resolution, size, etc. The render determiner circuitry 606 processes the input data and to generate an example render decision 706.

Referring again to FIG. 7, the render determiner circuitry 606 transmits the render decision 706 to the frame processor circuitry 616. The frame processor circuitry 616 generates render frames based on the screen share frames and the render decision 706. For example, the frame processor circuitry 616 may crop the screen share frames based on the active interaction region(s) 414 and/or a size of the receiver display screen 134 to generate the render frames. In some examples, the render frames are the screen share frames.

Figure 9A:
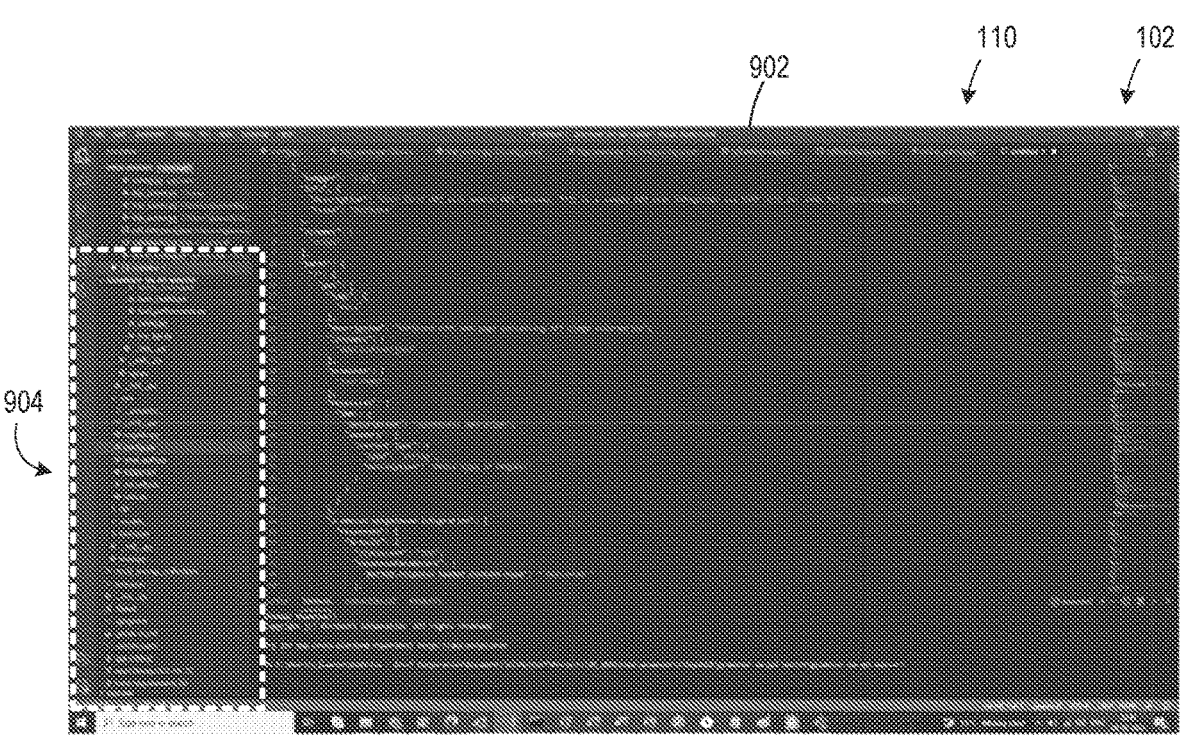
FIG. 9A is an illustration of an example transmitted screen during a video conference.
Figure 9B:
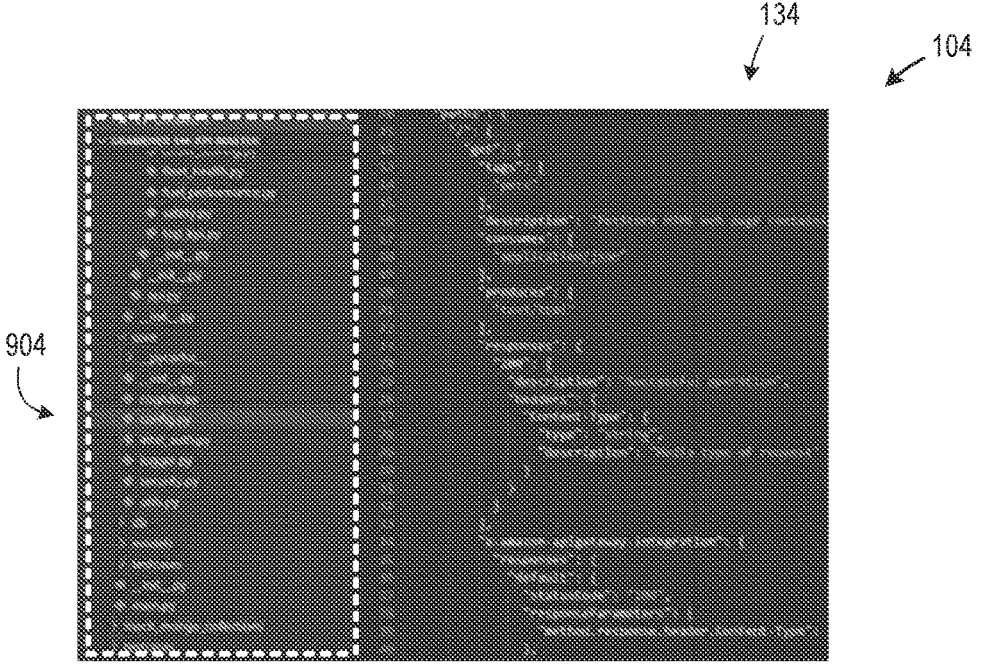
FIG. 9B is an illustration of an example receiving screen during the video conference of FIG. 9A in accordance with the teachings of this disclosure.

FIGS. 9A and 9B depict example screen share content as transmitted by a transmitter device and as rendered by a receiving device, respectively, in accordance with the teachings of this disclosure. FIG. 9A depicts an example transmitter electronic device 102 includes a display screen 110 used by a presenter during a screen share event. The transmitter electronic device 102 is in communication with a receiver electronic device 104 and/or other electronic devices during the screen share event. The display screen is relatively large (e.g., 32 inch diameter) and of higher resolution (e.g., 4 k resolution) as compared to a receiver screen 134 (e.g., 14 inch diameter, 1080p resolution) of the receiver electronic device 104 of FIG. 9B.

FIG. 9A illustrates an example screen share frame 902 and an example active interaction region 904 within the screen share frame. FIG. 9B illustrates the active interaction region 904 as rendered by the receiver device 104. As illustrated, the active interaction region 904 is much smaller and with a different aspect ratio than the receiver screen 134. Thus, the receiver device 104 determines to render the active interaction region 904 and additional area of the screen share frame to fit the content to the receiver screen 134 parameters.

Figure 10A:
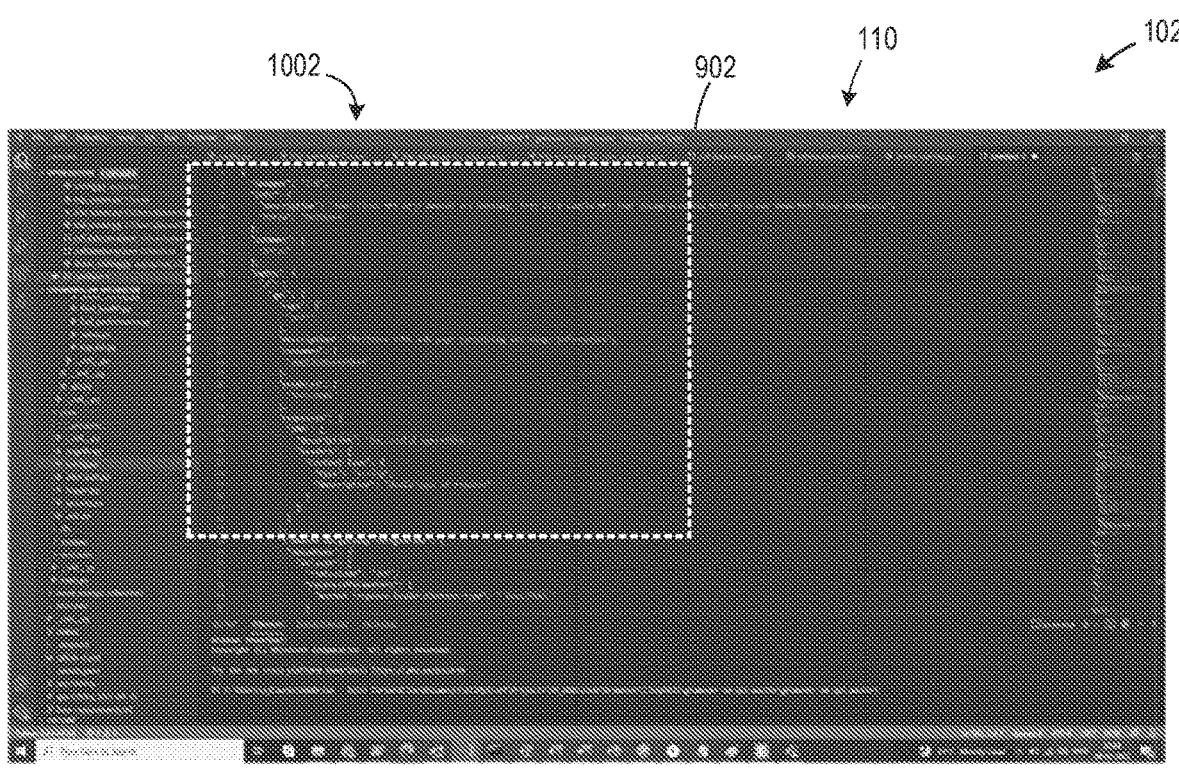
FIG. 10A is an illustration of another example transmitted screen during a video conference.
Figure 10B:
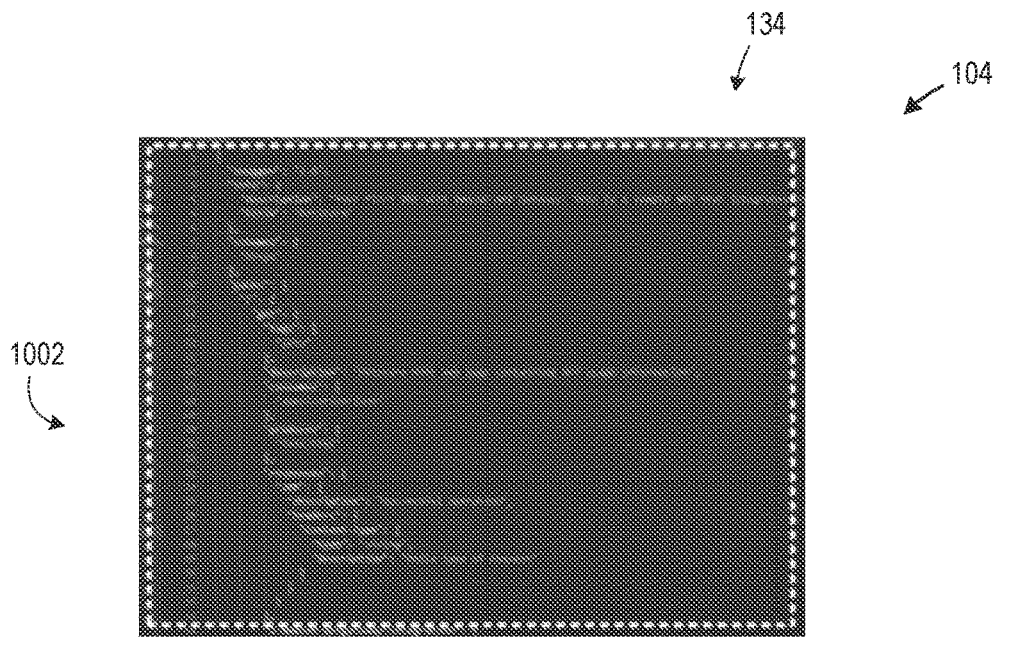
FIG. 10B is an illustration of an example receiving screen during the video conference of FIG. 10A in accordance with the teachings of this disclosure.

FIG. 10A depicts the example screen share content of FIG. 9A including another example active interaction region 1002 identified in accordance with the teachings of this disclosure. FIG. 10B depicts the active interaction region 1002 as rendered by another receiving device in accordance with the teachings of this disclosure. As illustrated, the active interaction region 1002 is substantially the same size and aspect ratio as the receiver screen 134. Thus, the receiver device 104 determines to render the active interaction region 1002 to fit the content to the receiver screen 134 parameters.

Figures 11A, 11B, 11C, 11D:
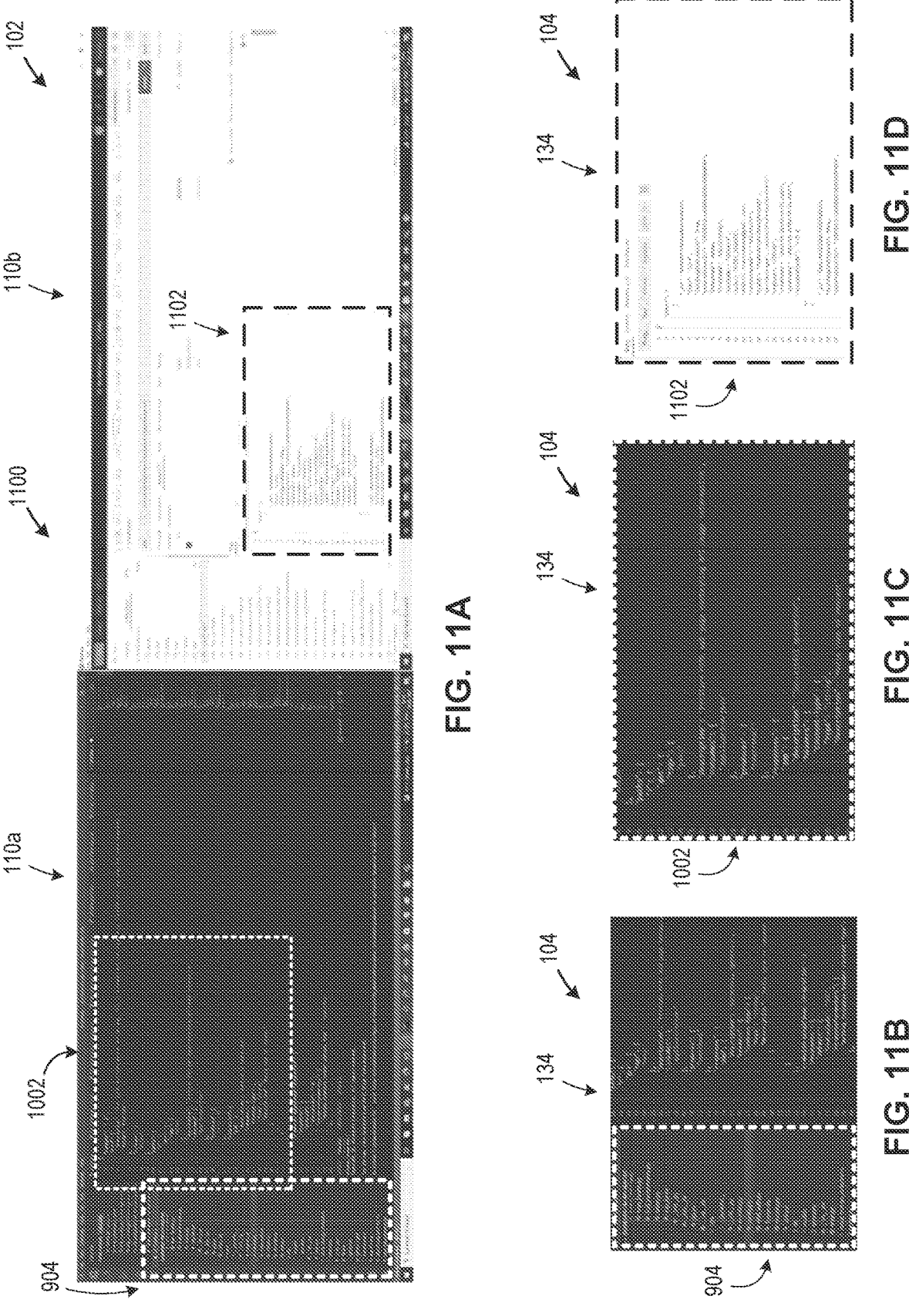
FIG. 11A is an illustration of another example transmitted screen during a video conference that includes dual monitors.
FIGS. 11B-11D are illustrations of example receiving screens at different time periods during the video conference of FIG. 11A in accordance with the teachings of this disclosure.

FIG. 11A depicts an example multi (e.g., dual) screen configuration of a transmitter electronic device 102. The transmitter electronic device 102 includes a first display screen 110a and a second display screen 110b, which are both used by a presenter to present screen share content (e.g., an example screen share frame 1100) during a screen share event. The transmitter electronic device 102 is in communication with a receiver electronic device 104 and/or other electronic devices during the screen share event. The display screens 110a, 110b are relatively large (e.g., 32 inch diameter) and of higher resolution (e.g., 4 k resolution) as compared to a receiver screen 134 (e.g., 14 inch diameter, 1080p resolution) of the receiver electronic device 104.

As illustrated in FIG. 11A, the transmitter display screens 110a, 110b includes a first active interaction region 904 at a first time (t0), a second active interaction region 1002 at a second time (t1), and a third active interaction region 1102 at a third time (t2). The first active interaction region 904 and the second active interaction region 1002 correspond to the first display screen 110a. The third active interaction region 1102 corresponds to the second display screen 110b. The transmitter electronic device 102 transmits an indication of the active interaction regions 904, 1002, 1102 to the receiver electronic device 104 along with the screen share frame 1100.

On receiving the active interaction regions 904, 1002, 1102 at times t0, t1, and t3, respectively, in the multiplexed metadata, the receiver electronic device 104 can make decisions to render the content such that the active interaction region is shown. This gives opportunity for the receiver to zoom the content accordingly so that it would become readable to the user. FIG. 11B illustrates the first active interaction region 904 of the screen share frame 1100 as rendered by the receiver electronic device 104 at the first time (t0). FIG. 11C illustrates the second active interaction region 1002 of the screen share frame 1100 as rendered by the receiver electronic device 104 at the second time (t1). FIG. 11D illustrates the third active interaction region 1102 of the screen share frame 1100 as rendered by the receiver electronic device 104 at the third time (t2). As illustrated in FIGS. 11A-11D, the video conference circuitry 132 of FIGS. 1, 2, and/or 6 can be used to dynamically render screen share content across transmitter display screen(s) 110a, 110b. The receiver display screen 134 transition to different active interaction regions 904, 1002, 1102 during the presentation while the user is interacting with, looking at or talking about a certain section of the transmitter display screen(s) 110a, 110b.

Flowcharts representative of example machine readable instructions, which may be executed to configure processor circuitry to implement the video conference circuitry 132 of FIGS. 1, 2, and/or 6, is shown in FIGS. 12-15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 12-15, many other methods of implementing the example video conference circuitry 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 12-15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 12:
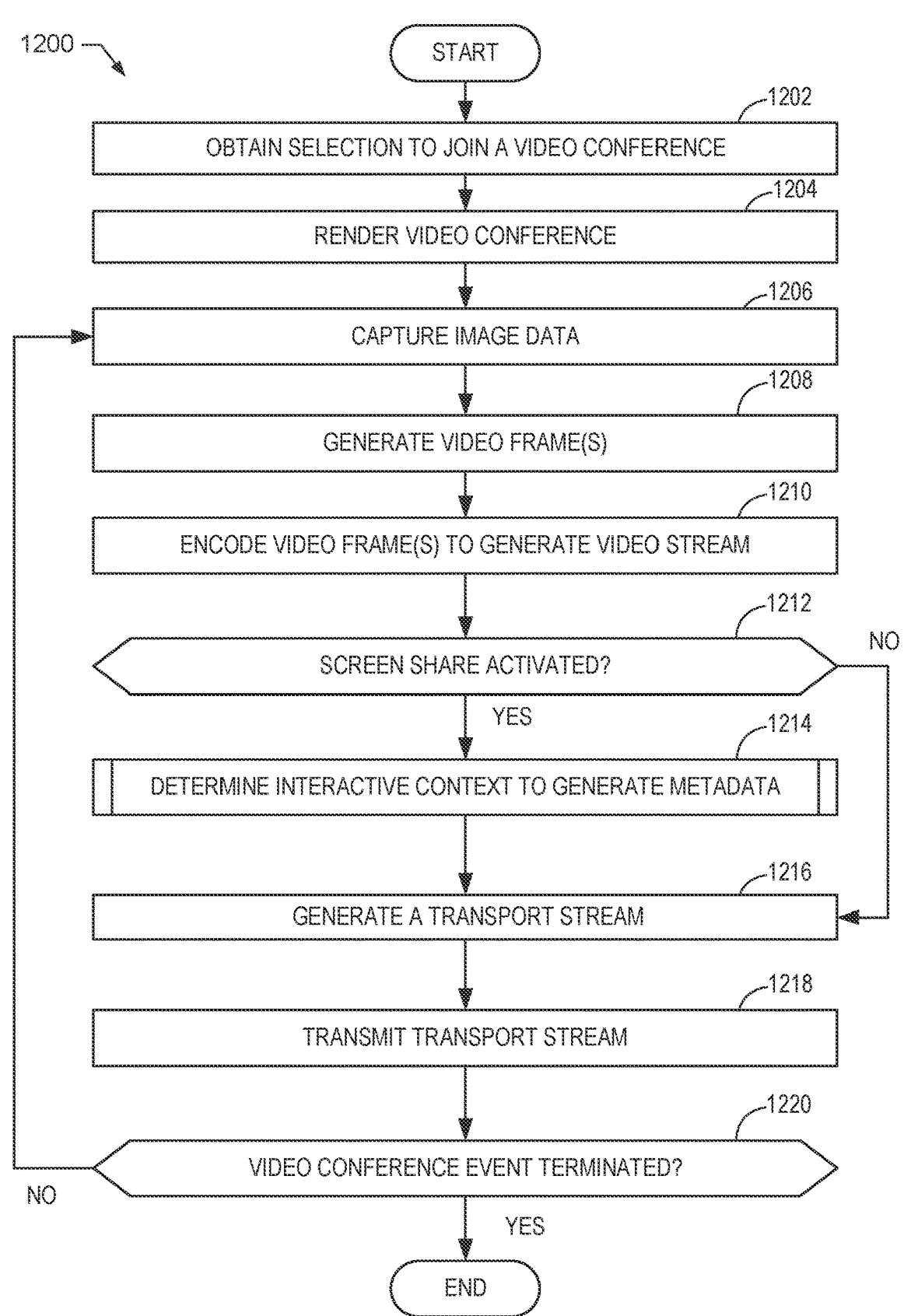

FIG. 12 is a flowchart representative of example machine readable instructions and/or example operations 1200 that may be executed and/or instantiated by processor circuitry to generate a multiplexed transport stream that includes screen share content and an interactive context. The machine readable instructions and/or the operations 1200 of FIG. 12 begin at block 1202, at which the interface circuitry 200 obtains a selection to join a video conference. For example, the interface circuitry 200 may obtain data related to a video conferencing event from a user via the user interface circuitry 130 of FIG. 1. The interface circuitry 200 obtains and analyzes data from components of the electronic device 102, such as the user interface circuitry 130, which is a graphical interface that allows the user of the electronic device 102 of FIG. 1 to input information (e.g., related to the video conference event, etc.) via the display screen 110 and/or via one or more input devices 112. In some examples, the user utilizes the user interface circuitry 130 generate a selection to join or leave the video conferencing meeting, which is consequently received by the interface circuitry 200.

At block 1204, the video conference circuitry 132 renders the video conference. For example, the video conference circuitry 132 may render the video conference event on the display screen(s) 110, which can be viewed and/or interacted with by a user via the user interface circuitry 130 of the electronic device 102. The rendered video conference can allow a user to make additional selections, such as initiation of a screen share event, termination of an event, etc.

At block 1206, the video conference circuitry 132 receives image data from an example camera 114. For example, the image data may corresponding to an environment surrounding a user of the electronic device 102. At block 1208, example video frame generator circuitry 202 generates video frames. For example, the video frame generator circuitry 202 generates video frames based on the image data from the camera 114. At block 1210, example encoder circuitry 224 receives and encodes the video frames to generate a video stream.

At block 1212, the interface circuitry 200 determines whether screen share is active. For example, the interface circuitry 200 may identify and/or obtain a user selection to start screen sharing (e.g., initializing a screen share event). If the answer to block 1204 is NO, control returns to block 1216, discussed below. If the answer to block 1212 is YES, control advances to block 1214, at which interactive context determiner circuitry 208 determines an interactive context to generate interaction metadata.

At block 1216 example multiplexer circuitry 226 generates a transport stream. For example, the multiplexer circuitry 226 can receives audio data (e.g., from an audio pipeline), video data (e.g., from a video pipeline), screen share frames, and/or interaction metadata and apply a multiplexing technique to generate the transport stream.

At block 1218, example communication circuitry 128 transmits the transport stream to one or more receiving devices, such as a receiving electronic device 104. For example, the communication circuitry 128 can transport the transport stream to the video conference server 108 of FIG. 1, which can send the transport stream to each audient participant in the video conference event. In some examples, the communication circuitry 128 transmits the transport stream directly to the receiving electronic device 104.

At block 1220, the interface circuitry 200 determines whether the video conference event has been terminated. For example, the interface circuitry 200 can determine whether a user of the electronic device 102 selected to terminate the video conference event (e.g., via the user interface circuitry 130 of FIG. 1). In additional or alternative example, the video conference event can be terminated in other manners. For example, if the electronic device 102 loses a connection to the network 106, if the electronic device 102 malfunctions, etc. If the answer to block 1220 is NO, control returns to block 1206, at which the camera 114 continues to capture image data.

FIG. 13 is a flowchart representative of example machine readable instructions and/or example operations 1210 that may be executed and/or instantiated by processor circuitry to determine an interactive context and active interaction region(s). The machine readable instructions and/or the operations 1210 of FIG. 13 begin at block 1302, at which example configuration determiner circuitry 214 determines application contextual data.

For example, the application contextual data can include an application that corresponds to the screen share content. In some examples, the application contextual data includes a nature of a rendered application to aid in determining an interactive context.

At block 1304, the configuration determiner circuitry 214 determine display contextual data. The display contextual data can include, for example, a size of the screen share content (e.g., based on a size of the display screen 110). In some examples, display contextual data includes an aspect ratio and/or resolution of the display screen 110. In some examples, the includes an indication of different display screens 110 that are being used for a screen share event.

At block 1306, the input determiner circuitry 216 obtains data from example input devices 110. For example, the execution circuitry 218 may obtain input data from HID inputs that are collected from HID devices (e.g., a mouse, a keyboard, a touchpad, etc.), such as the input device(s) 112 of FIG. 1. In some examples, the input data can include screen scrolling, user clicks and/or selections on a screen, etc.

At block 1308, the input determiner circuitry 216 obtains operating system (OS) events corresponding to the input device(s) 112. For example, the OS events may include interrupts generated by hardware devices (e.g., interrupts triggered by a keystroke on a keyboard, mouse position, etc.), software interrupt instructions (e.g., an application program requesting reading or writing data to/from memory), or state changes in polling of input devices (e.g., the input device(s) 112 of FIG. 1) and/or application programs. The input determiner circuitry 216 identifies OS events on the electronic device 102 that correspond to the HID inputs identified by the input determiner circuitry 216 by obtaining the OS events executed in response to the obtained HID inputs.

At block 1310, the execution circuitry 218 obtains sensor data from one or more sensor(s). For example, the execution circuitry 218 may receive image data from a camera 114, audio data from a microphone 116, and/or other types of sensor data. At block 1312, the execution circuitry 218 applies an ML model to the sensor data. For example, the execution circuitry 218 may apply an eye tracking model 212 to the camera 114 image data to perform eye tracking. The execution circuitry 218 may apply an NLP based model 212 to audio data to perform speech recognition. In some examples, the model(s) 212 applied by the execution circuitry 218 are based on an application corresponding to the screen share content.

At block 1314, the interactive context determiner circuitry 208 determines an interactive context using an ML model(s) 212 and/or a rule(s) 210 based on the collected data. uses obtained and/or generated information to identify the interactive context. For example, by applying a rule(s) 210 and/or interactive context determining model(s) 212 to obtained and/or generated data, the execution circuitry 218 determines a user's intent relative to the screen share content At block 1316, example active interaction region determiner circuitry 220 determines an active interaction region(s) that defines coordinates of an interaction area of a screen share frame. Based on the interactive context and the screen share coordinates, the active interaction region determiner circuitry 220 identifies coordinates of an area of a full screen share frame that includes the active interaction region. In some examples, a size of the active interaction region can vary (e.g., depending on the application).

At block 1318, the active interaction region determiner circuitry 220 generates interaction metadata for inclusion in the transport stream. For example, the interaction metadata can include the interactive context(s), the active interaction region(s), display screen(s) 110 information, etc. In some examples, the active interaction region determiner circuitry 220 transmits the interaction metadata to the multiplexer circuitry 226 for inclusion in the transport stream.

FIG. 14 is a flowchart representative of example machine readable instructions and/or example operations 1400 that may be executed and/or instantiated by processor circuitry to dynamically render a screen share event. The machine readable instructions and/or the operations 1400 of FIG. 14 begin at block 1402, at which example communication circuitry 228 receives a transport stream(s).

At block 1404, example de-multiplexer circuitry 602 applies a de-multiplexing algorithm to de-multiplex the transport stream to generate an encoded video stream and metadata corresponding to an interactive context and active interaction regions.

At block 1406, example decoder circuitry 604 decodes the video stream to generate video frames. At block 1408, example render determiner circuitry 606 analyzes data to generate a render decision. At block 1410, example frame processor circuitry 616 processes screen share frame(s) based on the render decision. At block 1412, the frame processor circuitry 616 transmits the processed screen share frames for render on the display screen 134. For example, the frame processor circuitry 616 may transmits the processed screen share frames to the user interface circuitry 130 for render on the display screen 134.

At block 1414, the video conference circuitry 132 determines whether the communication circuitry 228 received another transport stream. If the answer to block 1414 is YES, control returns to block 1404. If the answer to block 1414 is NO, control ends.

Figure 15:
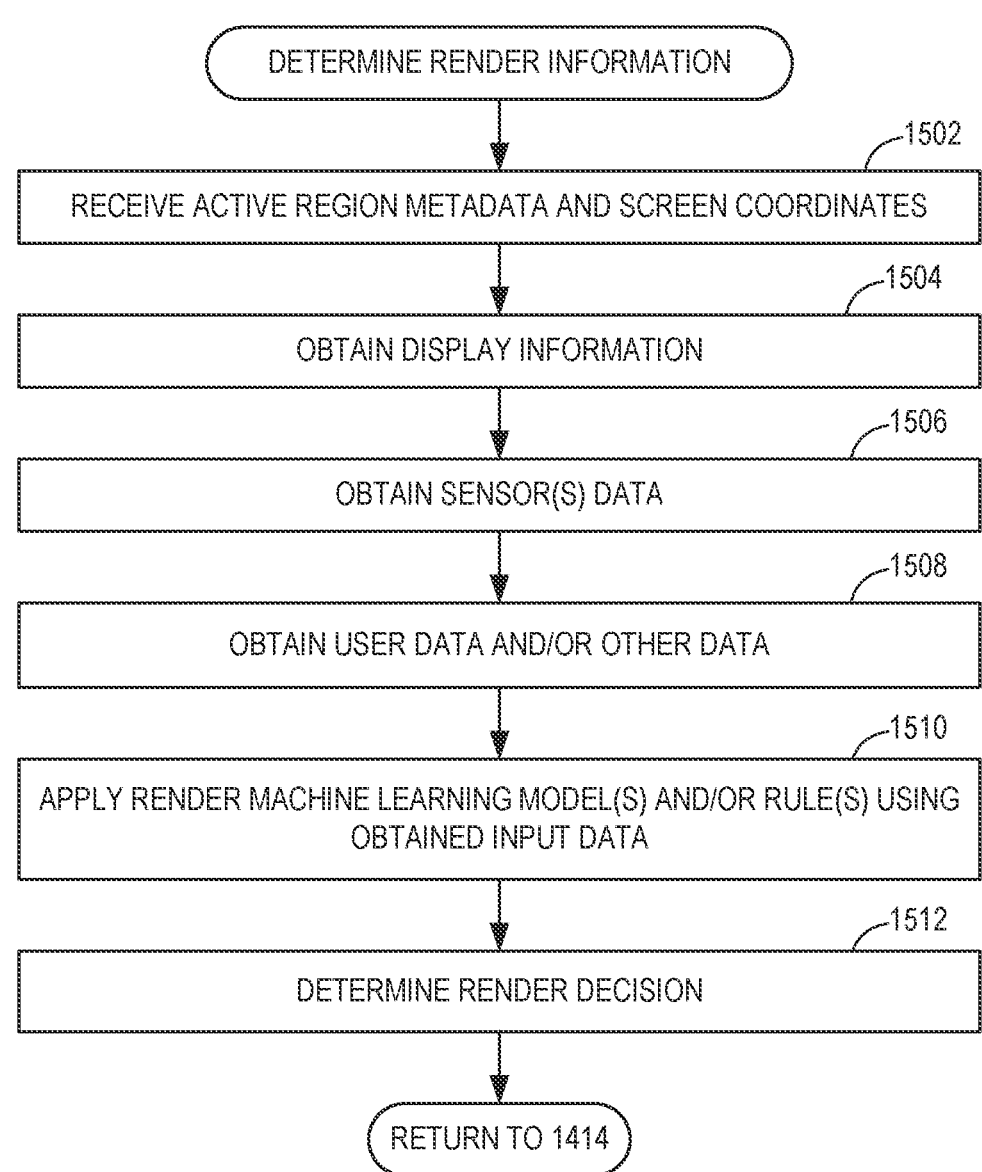

FIG. 15 is a flowchart representative of example machine readable instructions and/or example operations 1410 that may be executed and/or instantiated by processor circuitry to generate a render decision. The machine readable instructions and/or the operations 1410 of FIG. 15 begin at block 1502, at which the render determiner circuitry 606 receives the interaction metadata (e.g., from the de-multiplexer circuitry 602).

At block 1504, the configuration determiner circuitry 214 obtains display information of the display screen 134. For examples, the configuration determiner circuitry 214 may identify a size of the display screen 134, resolution of the display screen, etc.

At block 1506, example proximity determiner circuitry 614 receives sensor data from an example user proximity sensor 118. The proximity determiner circuitry 614 determines a distance of a respective audience participant (e.g., user) from the electronic device 104. At block 1508, the execution circuitry 218 obtains example user data 612 from the database 204 and/or the display information and user proximity information. For example, the user data 612 can include user preferences, user profiles, and/or other information to be used to determine a render decision. At block 1510, the execution circuitry 218 applies an ML model(s) 610 and/or an example rule(s) 608 using the obtained data. At block 1512, the render determiner circuitry 606 generates a render decision.

Figure 16:
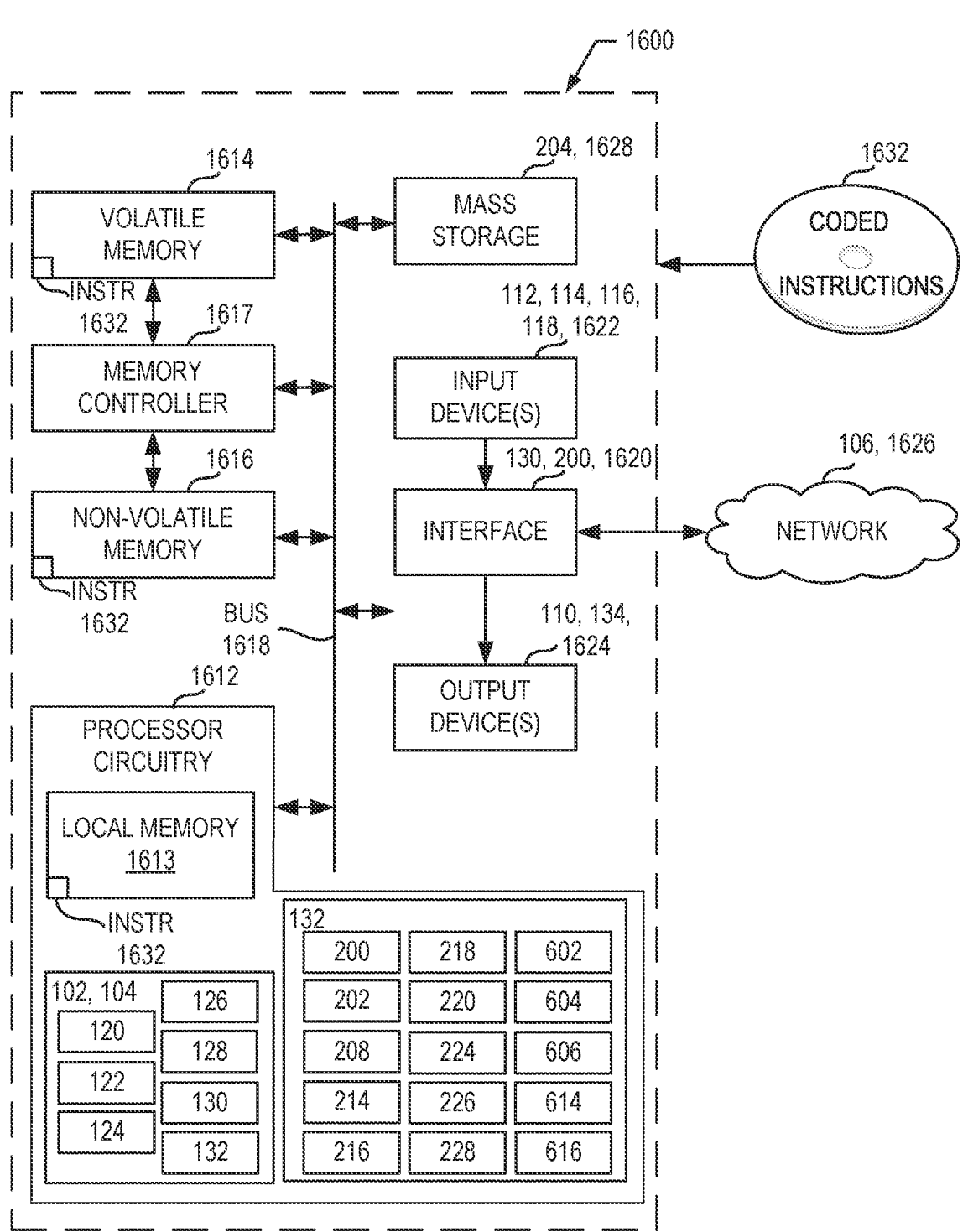
FIG. 16 is a block diagram of an example processing platform including processor circuitry structured to execute the example machine readable instructions and/or the example operations of FIGS. 12-15 to implement the video conference circuitry of FIGS. 1, 2, and/or 6.

FIG. 16 is a block diagram of an example processor platform 1600 structured to execute and/or instantiate the machine readable instructions and/or the operations of FIGS. 12-15 to implement the video conference circuitry 132 of FIGS. 1, 2, and/or 6. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements example interface circuitry 200, example interactive context determiner circuitry 208, example configuration determiner circuitry 214, example input determiner circuitry 216, example execution circuitry 218, example active interaction region determiner circuitry 220, example video frame generator circuitry 202, example encoder circuitry 224, example multiplexer circuitry 226, example communication circuitry 228, example de-multiplexer circuitry 602, example decoder circuitry 604, example render determiner circuitry 606, and/or example frame processor circuitry 616.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1632, which may be implemented by the machine readable instructions of FIGS. 12-15, may be stored in the mass storage device 1628, in the volatile memory 1614, in the non-volatile memory 1616, and/or on a removable non-transitory computer readable storage medium such as a CD or DVD.

Figure 17:
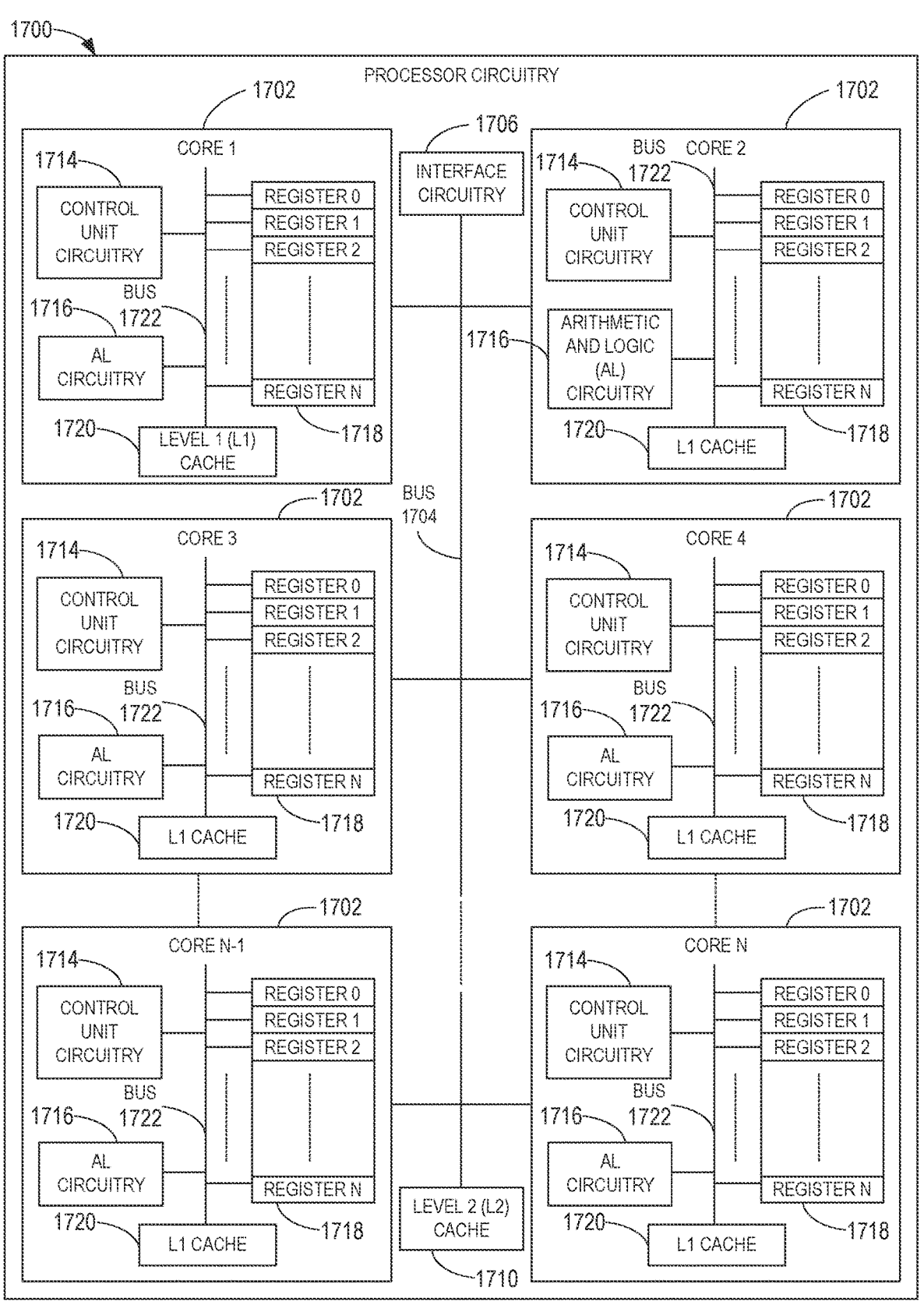
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a microprocessor 1700. For example, the microprocessor 1700 may be a general purpose microprocessor (e.g., general purpose microprocessor circuitry). The microprocessor 1700 executes some or all of the machine readable instructions of the flowcharts of FIGS. 12-15 to effectively instantiate the circuitry of FIGS. 1, 2, and/or 6 as logic circuits to perform the operations corresponding to those machine readable instructions. in some such examples, the circuitry of FIG. 2 is instantiated by the hardware circuits of the microprocessor 1700 in combination with the instructions. For example, the microprocessor 1700 may be implemented by multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowcharts of FIGS. 12-15.

The cores 1702 may communicate by a first example bus 1704. In some examples, the first bus 1704 may be implemented by a communication bus to effectuate communication associated with one(s) of the cores 1702. For example, the first bus 1704 may be implemented by at least one of an Inter-Integrated Circuit (I2C) bus, a Serial Peripheral Interface (SPI) bus, a PCI bus, or a PCIe bus. Additionally or alternatively, the first bus 1704 may be implemented by any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2 cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the local memory 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may be implemented by at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
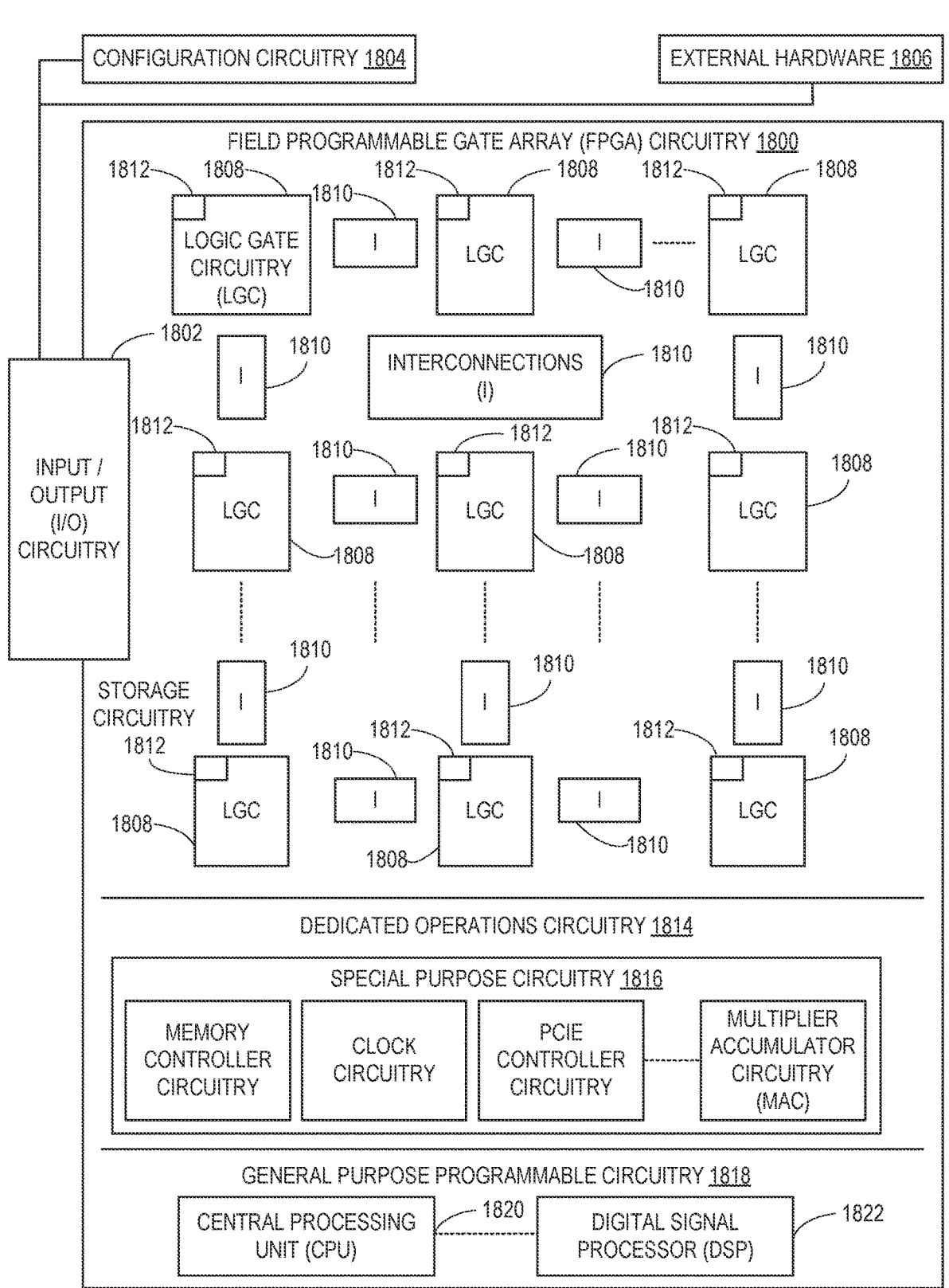
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. For example, the FPGA circuitry 1800 may be implemented by an FPGA. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 12-15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 12-15. In particular, the FPGA circuitry 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 12-15. As such, the FPGA circuitry 1800 may be structured to effectively instantiate some or all of the machine readable instructions of the flowcharts of FIGS. 12-15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 12-15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware 1806. For example, the configuration circuitry 1804 may be implemented by interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may be implemented by external hardware circuitry. For example, the external hardware 1806 may be implemented by the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and the configurable interconnections 1810 are configurable to instantiate one or more operations that may correspond to at least some of the machine readable instructions of FIGS. 12-15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The configurable interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIGS. 12-15 may be executed by one or more of the cores 1702 of FIG. 17, a second portion of the machine readable instructions represented by the flowcharts of FIGS. 12-15 may be executed by the FPGA circuitry 1800 of FIG. 18, and/or a third portion of the machine readable instructions represented by the flowcharts of FIGS. 12-15 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 1612 of FIG. 16 may be in one or more packages. For example, the microprocessor 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
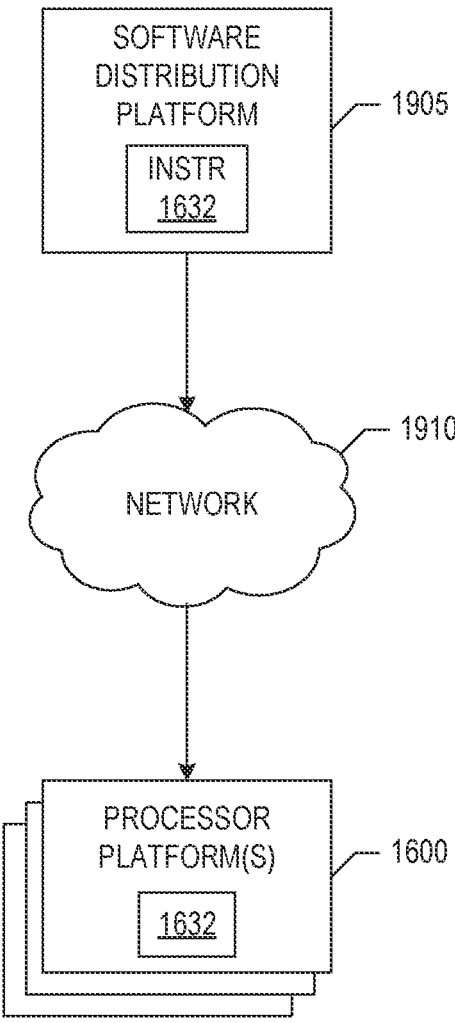
FIG. 19 is a block diagram of an example software distribution platform (e.g., one or more servers) to distribute software (e.g., software corresponding to the example machine readable instructions of FIGS. 12-15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions 1200, 1400 of FIGS. 12-15, as described above. The one or more servers of the example software distribution platform 1905 are in communication with an example network 1910, which may correspond to any one or more of the Internet and/or any of the example networks 106, 1626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions 1200, 1400 of FIGS. 12-15, may be downloaded to the example processor platform 1600, which is to execute the machine readable instructions 1632 to implement the video conference circuitry 132. In some examples, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that dynamically determine interaction display regions for screen sharing. Disclosed systems, methods, apparatus, and articles of manufacture improve the efficiency of using a computing device by dynamically determining an interactive context of a user relative to screen share content of a transmitter display screen during a video conference, which is used to determine an active interaction region(s) corresponding to the interactive context. Disclosed systems, methods, apparatus, and articles of manufacture transmit the interactive context and the active interaction region(s) to a receiving device of an audience participant as metadata along with full screen share frames, enabling the receiving device(s) to render screen share content in accordance with the respective receiving devices parameters and/or the audient participant's preferences. Thus, disclosed systems, methods, apparatus, and articles of manufacture facilities increase user experience by enabling rendering of screen share content at a receiving device such that the screen share content can be consumed by the audience participant regardless of a type of transmitter screen and/or a size and/or resolution of the transmitter screen. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to dynamically determine interaction display regions for screen sharing are disclosed herein. Further examples and combinations thereof include the following:

Example 1 includes an electronic device comprising a display; at least one sensor; at least one memory; machine readable instructions; and processor circuitry to at least one of instantiate or execute the machine readable instructions to generate a screen share frame corresponding to content rendered on the display and intended for a screen share event; identify application-related contextual data corresponding to the screen share event; determine an interactive context based on at least one of (a) the application-related contextual data, or (b) sensor data from the at least one sensor, the interactive context including identification of an interaction region of the screen share frame; generate interaction metadata that includes the interactive context; and transmit a transport stream that includes the interaction metadata and the screen share frame.

Example 2 includes the electronic device of example 1, wherein the processor circuitry is to generate the screen share frame in response to detecting initialization of the screen share event.

Example 3 includes the electronic device of example 1, wherein the screen share frame includes a rendered application, and wherein the application-related contextual data includes information corresponding to the rendered application.

Example 4 includes the electronic device of example 1, wherein the identification of the interactive context is based on display-related contextual data, the processor circuitry to identify the display-related contextual data that includes parameters of the display.

Example 5 includes the electronic device of example 4, wherein the display is a first display, the electronic device further including a second display, and wherein the processor circuitry is to identify the display-related contextual data by determining whether the first display includes the content that is rendered and intended for the screen share frame; determining whether the second display includes the content that is rendered and intended for the screen share event; and identifying, based on the determinations, the parameters for at least one of the first display or the second display, the parameters to include an identifier of the at least one of the first display or the second display.

Example 6 includes the electronic device of example 1, wherein the processor circuitry is to identify the interactive context based on input data relative to the screen share event.

Example 7 includes the electronic device of example 6, wherein the input data includes human interface device (HID)-related data received from a HID, the HID corresponding to at least one of a mouse, a keyboard, or a touchpad.

Example 8 includes the electronic device of example 6, wherein the input data includes operating system events corresponding to human interface device (HID)-related data.

Example 9 includes the electronic device of example 6, wherein the at least one sensor includes a microphone, and wherein the input data includes language data, the processor circuitry to generate the language data by receiving audio data from the microphone; and applying a natural language processing based model to the audio data.

Example 10 includes the electronic device of example 6, wherein the at least one sensor includes a camera, and wherein the input data includes eye tracking data, the processor circuitry to generate the eye tracking data by receiving image data from the camera; and applying an image recognition model to the image data.

Example 11 includes the electronic device of example 6, wherein the processor circuitry is to determine the interactive context by collecting a sequence of the input data and a corresponding sequence of application-related contextual data over a period of time; processing the sequence of the input data and the corresponding sequence of the application-related contextual data to predict user interaction intent relative to the screen share frame for the period of time; and identifying the interactive context for the period of time based on the predicted user interaction intent relative to the screen share frame for the period of time.

Example 12 includes the electronic device of example 11, wherein the sequence of the input data and the corresponding sequence of the application contextual data is processed using at least one of a machine learning model or a rule.

Example 13 includes the electronic device of example 1, wherein the interaction region is represented by coordinates relative to the screen share frame.

Example 14 includes the electronic device of example 1, wherein, prior to transmitting the transport stream, the processor circuitry is to generate the transport stream by multiplexing the interaction metadata and the screen share frame.

Example 15 includes a non-transitory machine readable storage medium comprising instructions that, when executed, cause processor circuitry to at least generate a screen share image corresponding to content rendered on a display used for a screen share event; identify application-related contextual information corresponding to the screen share event; predict an interactive context based on at least one of (a) the application-related contextual information, or (b) sensor data based on signals output by a sensor, the interactive context including an interaction region of the screen share image; generate interaction metadata corresponding to the interactive context and the interaction region; and send a transport stream containing the interaction metadata and the screen share image.

Example 16 includes the non-transitory machine readable storage medium of example 15, wherein the instructions, when executed, cause the processor circuitry to generate the screen share image in response to detecting a selection to start the screen share event.

Example 17 includes the non-transitory machine readable storage medium of example 15, wherein the screen share image includes an application rendered on the display, and wherein the application-related contextual information includes data corresponding to the rendered application.

Example 18 includes the non-transitory machine readable storage medium of example 15, wherein the prediction of the interactive context is based on display-related contextual information, and wherein the processor circuitry to identify the display-related contextual data that includes parameters of the display.

Example 19 includes the non-transitory machine readable storage medium of example 18, wherein the display is a first display, and wherein the instructions, when executed, cause the processor circuitry to identify the display-related contextual data by determining whether a second display is used for the screen share event; and in response to determining that the second display is used for the screen share event, identifying the parameters the first display and the second display, the parameters to include an identifier of the first display and the second display.

Example 20 includes the non-transitory machine readable storage medium of example 15, wherein the instructions, when executed, cause the processor circuitry to predict the interactive context based on input data relative to the screen share event.

Example 21 includes the non-transitory machine readable storage medium of example 20, wherein the input data includes user input data received from a human interface device (HID), the HID corresponding to at least one of a mouse, a keyboard, or a touchpad.

Example 22 includes the non-transitory machine readable storage medium of example 20, wherein the input data includes operating system events corresponding to human interface device (HID)-related user input data.

Example 23 includes the non-transitory machine readable storage medium of example 20, wherein the sensor is a microphone, and wherein the input data includes language data, the processor circuitry to generate the language data by receiving audio data from the microphone; and applying a natural language processing based model to the audio data.

Example 24 includes the non-transitory machine readable storage medium of example 20, wherein the sensor is a camera, and wherein the input data includes eye tracking data, the processor circuitry to generate the eye tracking data by receiving image data from the camera; and applying an image recognition model to the image data.

Example 25 includes the non-transitory machine readable storage medium of example 20, wherein the instructions, when executed, cause the processor circuitry to predict the interactive context by collecting a series of the input data and a corresponding series of application-related contextual information during a time period; analyzing the series of the input data and the corresponding series of application-related contextual information to predict user interaction intent relative to the screen share image for the time period; and predicting the interactive context for the time period based on the predicted user interaction intent relative to the screen share image.

Example 26 includes the non-transitory machine readable storage medium of example 25, wherein the series of the input data and the corresponding series of the application-related contextual information is analyzed using at least one of a machine learning model or a rule.

Example 27 includes the non-transitory machine readable storage medium of example 15, wherein the interaction region of the screen share image is coordinates within the screen share image corresponding to the interactive context.

Example 28 includes the non-transitory machine readable storage medium of example 15, wherein, prior to the sending the transport stream, the processor circuitry is to generate the transport stream by multiplexing the interaction metadata and the screen share image.

Example 29 includes a method comprising generating, by executing machine readable instructions with at least one processor, a display share frame corresponding to content rendered on a display and selected for a display share event; determining, by executing the machine readable instructions with the at least one processor, an interactive intent based on at least one of application contextual data and sensor data from at least one sensor, the interactive intent including an interaction region of the display share frame; generating, by executing the machine readable instructions with the at least one processor, interaction metadata that includes the interactive intent and the interaction region; and transmitting, by executing the machine readable instructions with the at least one processor, the interaction metadata and the display share frame.

Example 30 includes the method of example 29, further including, prior to the generating the screen share frame, detecting activation of the display share event.

Example 31 includes the method of example 29, wherein the display share frame includes an application, and wherein the application contextual data includes information corresponding to the application.

Example 32 includes the method of example 29, wherein the identifying the interactive intent includes identifying the interaction region, and wherein the identifying the interaction region is further based on display related contextual data, the display related contextual data including parameters of the at least one display.

Example 33 includes the method of example 29, wherein the identifying the interactive intent is further based on user-related data relative to the display share event.

Example 34 includes the method of example 33, wherein the user-related data includes human interface device (HID)-related data received from a HID, the HID corresponding to at least one of a mouse, a keyboard, a microphone, or a touchpad.

Example 35 includes the method of example 33, wherein the user-related data includes operating system events corresponding to human interface device (HID) inputs.

Example 36 includes the method of example 33, wherein the sensor includes an audio sensor, wherein the user-related data includes speech data, the method further including generating the speech data by receiving audio data from the audio sensor; and applying a natural language processing based model to the audio data.

Example 37 includes the method of example 33, wherein the sensor includes an image sensor, wherein the user-related data includes eye tracking data, the method further including generating the eye tracking data by receiving image data from the image sensor; and applying an image recognition model to the image data.

Example 38 includes the method of example 33, wherein the determining the interactive intent includes collecting the user-related data, the user-related data including timestamps; processing the user-related data in view of the timestamps and the application contextual data to estimate user intent relative to the display share frame; and identifying the interactive intent based on the estimated user intent relative to the display share frame.

Example 39 includes the method of example 38, wherein the processing the user-related data includes applying at least one of a machine learning model or a rule to the user-related data in view of the timestamps and the application contextual data.

Example 40 includes the method of example 29, wherein the interaction region of the display share frame is represented by coordinates relative to the display share frame.

Example 41 includes the method of example 29, further including generating a transport stream by multiplexing the interaction metadata and the display share frame, the transmitting including transmitting the transport stream.

Example 42 includes an electronic device comprising video frame generator circuitry to generate a screen share frame corresponding to content rendered on a display and intended for a screen share event; configuration determiner circuitry to identify application-related contextual data corresponding to the screen share event; interactive context determiner circuitry to obtain sensor data from at least one sensor; identify an interactive context that includes an interaction region of the screen share frame based on at least one of the application-related contextual data or the sensor data; and generate interaction metadata that includes the interactive context and the interaction region; and communication circuitry to transmit a transport stream that includes the interaction metadata and the screen share frame.

Example 43 includes the electronic device of example 42, further including interface circuitry to detect a selection to start the screen share event, wherein the video frame generator circuitry is to generate the screen share frame in response to the detection.

Example 44 includes the electronic device of example 34, wherein the screen share frame includes a rendered application, and wherein the application-related contextual data includes information corresponding to the rendered application.

Example 45 includes the electronic device of example 42, wherein the interactive context determiner circuitry is to identify display-related contextual data, the display related context data including parameters of the display, and wherein the identifying the interactive context is based on the display-related contextual data.

Example 46 includes the electronic device of example 45, wherein the display is a first display, the electronic device further including a second display, and wherein the screen share frame includes content rendered on the first display, the display-related contextual data to include parameters of the first display and parameters of the second display.

Example 47 includes the electronic device of example 34, wherein the interactive context determiner circuitry is to identify the interactive context based on input data relative to the screen share event.

Example 48 includes the electronic device of example 47, wherein the input data includes human interface device (HID)-related data received from a HID, the HID corresponding to at least one of a mouse, a keyboard, or a touchpad.

Example 49 includes the electronic device of example 47, wherein the input data includes operating system events corresponding to human interface device (HID)-related data.

Example 50 includes the electronic device of example 47, wherein the at least one sensor includes a microphone, and wherein the input data includes language data, the interactive context determiner circuitry to generate the language data by receiving audio data from the microphone; and applying a natural language processing based model to the audio data.

Example 51 includes the electronic device of example 47, wherein the at least one sensor includes a camera, and wherein the input data includes eye tracking data, the interactive context determiner circuitry to generate the eye tracking data by receiving image data from the camera; and applying an image recognition model to the image data.

Example 52 includes the method of example 47, wherein the interactive context determiner circuitry is to determine the interactive context by collecting a sequence of the input data and a corresponding sequence of application-related contextual data over a period of time; processing the sequence of the input data and the corresponding sequence of application-related contextual data to predict user interaction intent relative to the screen share frame for the period of time; and identifying the interactive context for the period of time based on the predicted user interaction intent relative to the screen share frame for the period of time.

Example 53 includes the electronic device of example 52, wherein the sequence of the input data and the corresponding sequence of application contextual data is processed using at least one of a machine learning model or a rule, the electronic device further including execution circuitry to execute the at least one of the machine learning model or the rule.

Example 54 includes the electronic device of example 42, wherein the interaction region of the screen share frame is represented by coordinates of the interaction region relative to the screen share frame.

Example 55 includes the electronic device of example 42, further including multiplexer circuitry, and wherein, prior to transmission of the transport stream, the multiplexer circuitry is to generate the transport stream by multiplexing the interaction metadata and the screen share frame.

Example 56 includes an electronic device to transmit screen share content comprising means for generating a frame to generate a screen share frame corresponding to content rendered on at least one display, the content intended for a screen share; means for determining an interactive context to identify an application context corresponding to the screen share; determine an interactive context based on at least one of (a) the application context and (b) sensor data from a sensor, the interactive context including an interaction region of the screen share frame; and generate interaction metadata that includes the interactive context and the interaction region; and means for transmitting to transmit the interaction metadata and the screen share frame in a transport stream.

Example 57 includes the electronic device of example 56, further including means for detecting a selection to begin screen share.

Example 58 includes the electronic device of example 56, wherein the screen share frame includes an image of a rendered application, and wherein the application context includes information corresponding to the rendered application.

Example 59 includes the electronic device of example 56, wherein the determining the interaction region of the interactive context is based on display context data, the display context data including parameters of the at least one display.

Example 60 includes the electronic device of example 56, wherein the means for determining the interactive context is to identify the interactive context based on input data related to the screen share.

Example 62 includes the electronic device of example 60, wherein the input data includes user input-related data received from an input device, the input device corresponding to at least one of a mouse, a keyboard, or a touchpad.

Example 62 includes the electronic device of example 60, wherein the input data includes operating system event data corresponding to user input-related data.

Example 63 includes the electronic device of example 60, wherein the sensor includes a microphone, and wherein the input data includes language data, the means for determining the interactive context to generate the language data by receiving audio data from the microphone; and applying a natural language processing based model to the audio data.

Example 64 includes the electronic device of example 60, wherein the sensor includes a camera, and wherein the input data includes eye tracking data, the means for determining the interactive context to generate the eye tracking data by receiving image data from the camera; and applying an image recognition model to the image data.

Example 65 includes the electronic device of example 60, wherein the means for determining the interactive context is to determine the interactive context by collecting a sequence of the input data during a period of time; processing the sequence of the input data to estimate user interaction intent relative to the screen share frame for the period of time; and identifying the interactive context for the period of time based on the estimated user interaction intent relative to the screen share frame for the period of time.

Example 66 includes the electronic device of example 65, wherein the means for determining the interactive context is to process the sequence of the input data using at least one of a machine learning model or a rule.

Example 67 includes the electronic device of example 56, wherein the interaction region of the screen share frame is represented by coordinates of the interaction region relative to the screen share frame.

Example 68 includes the electronic device of example 56, further including means for generating a transport stream to generate the transport stream.

Example 69 includes an electronic device to render screen share content comprising a display; at least one sensor; at least one memory; machine readable instructions; and processor circuitry to at least one of instantiate or execute the machine readable instructions to separate a received transport stream to generate a screen share frame and interaction metadata; determine an interaction region of the screen share frame based on the interaction metadata; identify parameters of the display; and generate a render decision by determining how to render the screen share frame based on the parameters of the display and the interaction region.

Example 70 includes the electronic device of example 69, wherein the render decision is further based on user preference data.

Example 71 includes the electronic device of example 69, wherein the render decision is further based on sensor data from the at least one sensor.

Example 72 includes the electronic device of example 71, wherein the at least one sensor includes a user proximity sensor, and wherein the render decision is based on a distance of a user from the electronic device.

Example 73 includes the electronic device of example 71, wherein the parameters of the display include at least one of a size of the display or a resolution of the display.

Example 74 includes the electronic device of example 71, wherein the processor circuitry is to compare the parameters of the display to coordinates of the screen share frame to determine whether to render the screen share frame or a portion of the screen share frame.

Example 75 includes the electronic device of example 74, wherein the portion of the screen share frame includes the interaction region of the screen share frame.

Example 76 includes the electronic device of example 74, wherein the portion of the screen share frame includes the interaction region of the screen share frame and a region adjacent the interaction region.

Example 77 includes the electronic device of example 69, wherein the processor circuitry is to generate the render decision using at least one of a machine learning model or a rule.

Example 78 includes the electronic device of example 69, wherein the render decision includes coordinates of the screen share frame to render on the display.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An electronic device, comprising:
   a first display;
   a second display;
   at least one sensor;
   at least one memory;
   machine readable instructions; and
   processor circuitry to at least one of instantiate or execute the machine readable instructions to:
      generate a screen share frame corresponding to content rendered on the first display and intended for a screen share event;
      identify application-related contextual data corresponding to the screen share event;
      determine whether the first display includes the content that is rendered and intended for the screen share event;
      determine whether the second display includes the content that is rendered and intended for the screen share event; and
      identify, based on the determinations, parameters for at least one of the first display or the second display, the parameters to include an identifier of the at least one of the first display or the second display;
      determine an interactive context based on the parameters and at least one of (a) the application-related contextual data, or (b) sensor data from the at least one sensor, the interactive context including an identification of an interaction region of the screen share frame;
      generate interaction metadata that includes the interactive context; and transmit a transport stream that includes the interaction metadata and the screen share frame.

2. The electronic device of claim 1, wherein the processor circuitry is to generate the screen share frame in response to detecting initialization of the screen share event.

3. The electronic device of claim 1, wherein the screen share frame includes a rendered application, and wherein the application-related contextual data includes information corresponding to the rendered application.

4. The electronic device of claim 1, wherein the identification of the interactive context is based on display-related contextual data, the processor circuitry to identify the display-related contextual data that includes parameters of the first display.

5. The electronic device of claim 1, wherein the processor circuitry is to identify the interactive context based on input data relative to the screen share event.

6. The electronic device of claim 5, wherein the input data includes human interface device (HID)-related data received from a HID, the HID corresponding to at least one of a mouse, a keyboard, or a touchpad.

7. The electronic device of claim 5, wherein the input data includes operating system events corresponding to human interface device (HID)-related data.

8. The electronic device of claim 5, wherein the at least one sensor includes a microphone, and wherein the input data includes language data, the processor circuitry to generate the language data by:

receiving audio data from the microphone; and applying a natural language processing based model to the audio data.

9. The electronic device of claim 5, wherein the at least one sensor includes a camera, and wherein the input data includes eye tracking data, the processor circuitry to generate the eye tracking data by:

receiving image data from the camera; and applying an image recognition model to the image data.

10. The electronic device of claim 5, wherein the processor circuitry is to determine the interactive context by:

collecting a sequence of the input data and a corresponding sequence of the application-related contextual data over a period of time;

processing the sequence of the input data and the corresponding sequence of the application-related contextual data to predict user interaction intent relative to the screen share frame for the period of time; and identifying the interactive context for the period of time based on the predicted user interaction intent relative to the screen share frame for the period of time.

11. The electronic device of claim 10, wherein the sequence of the input data and the corresponding sequence of the application contextual data is processed using at least one of a machine learning model or a rule.

12. The electronic device of claim 1, wherein the interaction region is represented by coordinates relative to the screen share frame.

13. At least one non-transitory machine readable storage medium comprising instructions that, when executed, cause processor circuitry to at least:

generate a screen share image corresponding to content rendered on at least one of a first display or a second display used for a screen share event;

identify application-related contextual information corresponding to the screen share event;

determine whether the first display includes the content that is rendered and intended for the screen share event;

determine whether the second display includes the content that is rendered and intended for the screen share event; and identify, based on the determinations, parameters for the at least one of the first display or the second display, the parameters to include an identifier of the at least one of the first display or the second display;

predict an interactive context based on the parameters and at least one of (a) the application-related contextual information, or (b) sensor data based on signals output by a sensor, the interactive context including an interaction region of the screen share image;

generate interaction metadata corresponding to the interactive context and the interaction region; and send a transport stream containing the interaction metadata and the screen share image.

14. The at least one non-transitory machine readable storage medium of claim 13, wherein the screen share image includes an application rendered on the first display, and wherein the application-related contextual information includes data corresponding to the rendered application.

15. The at least one non-transitory machine readable storage medium of claim 13, wherein the prediction of the interactive context is based on display-related contextual data, and wherein the processor circuitry to identify the display-related contextual data that includes parameters of the first display.

16. The at least one non-transitory machine readable storage medium of claim 13, wherein the instructions, when executed, cause the processor circuitry to predict the interactive context based on input data relative to the screen share event.

17. The at least one non-transitory machine readable storage medium of claim 16, wherein the input data includes user input data received from a human interface device (HID), the HID corresponding to at least one of a mouse, a keyboard, or a touchpad.

18. The at least one non-transitory machine readable storage medium of claim 16, wherein the input data includes operating system events corresponding to human interface device (HID)-related user input data.

19. The at least one non-transitory machine readable storage medium of claim 16, wherein the sensor is a microphone, and wherein the input data includes language data, the processor circuitry to generate the language data by:

receiving audio data from the microphone; and applying a natural language processing based model to the audio data.

20. The at least one non-transitory machine readable storage medium of claim 16, wherein the sensor is a camera, and wherein the input data includes eye tracking data, the processor circuitry to generate the eye tracking data by:

receiving image data from the camera; and applying an image recognition model to the image data.

21. A method comprising:

generating, by executing machine readable instructions with at least one processor, a display share frame corresponding to content rendered on at least one of a first display or a second display, the display share frame selected for a display share event;

determining whether the first display includes the content that is rendered and intended for the display share event;

determining whether the second display includes the content that is rendered and intended for the display share event; and identifying, based on the determinations, parameters for the at least one of the first display or the second display, the parameters to include an identifier of the at least one of the first display or the second display;

determining, by executing the machine readable instructions with the at least one processor, an interactive intent based on the parameters and at least one of application contextual data and sensor data from at least one sensor, the interactive intent including an interaction region of the display share frame;

generating, by executing the machine readable instructions with the at least one processor, interaction metadata that includes the interactive intent and the interaction region; and transmitting, by executing the machine readable instructions with the at least one processor, the interaction metadata and the display share frame.

* * * * *